United States Patent
Akaike et al.

(10) Patent No.: US 8,732,582 B2
(45) Date of Patent: May 20, 2014

(54) DISPLAY CONTROL APPARATUS, DISPLAY CONTROL METHOD, DISPLAY CONTROL PROGRAM, AND DISPLAY SYSTEM

(75) Inventors: Kazuhiro Akaike, Minato-ku (JP); Atsushi Okada, Minato-ku (JP); Hideyuki Tanaka, Saitama (JP)

(73) Assignee: Sony Corporation, Tokyo (JP)

( * ) Notice: Subject to any disclaimer, the term of this patent is extended or adjusted under 35 U.S.C. 154(b) by 922 days.

(21) Appl. No.: 12/297,272

(22) PCT Filed: Mar. 7, 2008

(86) PCT No.: PCT/JP2008/054197
§ 371 (c)(1),
(2), (4) Date: Oct. 15, 2008

(87) PCT Pub. No.: WO2008/108469
PCT Pub. Date: Sep. 12, 2008

(65) Prior Publication Data
US 2009/0282340 A1 Nov. 12, 2009

(30) Foreign Application Priority Data

Mar. 7, 2007 (JP) .................................. 2007-057108
Apr. 11, 2007 (JP) .................................. 2007-104043

(51) Int. Cl.
*G06F 3/0481* (2013.01)
(52) U.S. Cl.
CPC .................................... *G06F 3/0481* (2013.01)
USPC ........... 715/732; 715/730; 715/764; 715/781; 715/788; 715/810
(58) Field of Classification Search
USPC .................. 715/730, 732, 764, 781, 788, 810
See application file for complete search history.

(56) References Cited

U.S. PATENT DOCUMENTS 6,856,422 B1 * 2/2005 Higashibata et al. ......... 358/1.18
7,188,319 B2 * 3/2007 Amadio et al. ............... 715/835
(Continued)

FOREIGN PATENT DOCUMENTS

JP          8 335387          12/1996
JP          3126031           11/2000
(Continued)

OTHER PUBLICATIONS

Chinese Office Action issued Jun. 11, 2010, in Patent Application No. 200880000167.0 (English translation of the Chinese Office Action previously filed Aug. 11, 2010, submitting Chinese version of the Office Action only).

(Continued)

*Primary Examiner* — Amy Ng
*Assistant Examiner* — Claudia Dragoescu
(74) *Attorney, Agent, or Firm* — Oblon, Spivak, McClelland, Maier & Neustadt, L.L.P.

(57) ABSTRACT

A display control apparatus which realizes display capable of providing an overview of a group of thumbnail images and which includes an object controller (52*a*) for performing control to, when a viewer (52) allocates images to be displayed to a predetermined number of image-frame objects (52*g*), in the case where the number of the images to be allocated to the individual image-frame objects exceeds the number of the image-frame objects (52*g*), allocate a plurality of images to at least some of the image-frame objects (52*g*) and, when the plurality of images are allocated to each image-frame object (52*g*), display all the images to be displayed within a certain time by switching the images to be displayed at predetermined time intervals.

9 Claims, 25 Drawing Sheets

(56) References Cited

U.S. PATENT DOCUMENTS

| | | |
|---|---|---|
| 7,433,518 B2 * | 10/2008 | Shiratani .................. 382/190 |
| 7,779,358 B1 * | 8/2010 | Gupta et al. ............... 715/730 |
| 2003/0072486 A1 * | 4/2003 | Loui et al. .................. 382/175 |
| 2006/0078315 A1 * | 4/2006 | Wada et al. ................. 386/117 |
| 2006/0200475 A1 * | 9/2006 | Das et al. .................... 707/100 |

FOREIGN PATENT DOCUMENTS

| | | |
|---|---|---|
| JP | 2002-112079 | 4/2002 |
| JP | 2003-271282 | 9/2003 |
| JP | 2005-301889 | 10/2005 |
| JP | 2006 74667 | 3/2006 |
| JP | 2006 86612 | 3/2006 |
| JP | 2006 109410 | 4/2006 |
| JP | 2006-279118 | 10/2006 |
| JP | 2006-279119 | 10/2006 |
| JP | 2007-201566 | 8/2007 |

OTHER PUBLICATIONS

Japanese Office Action in Japanese Application 2008-057418 dated Jan. 10, 2012.

* cited by examiner

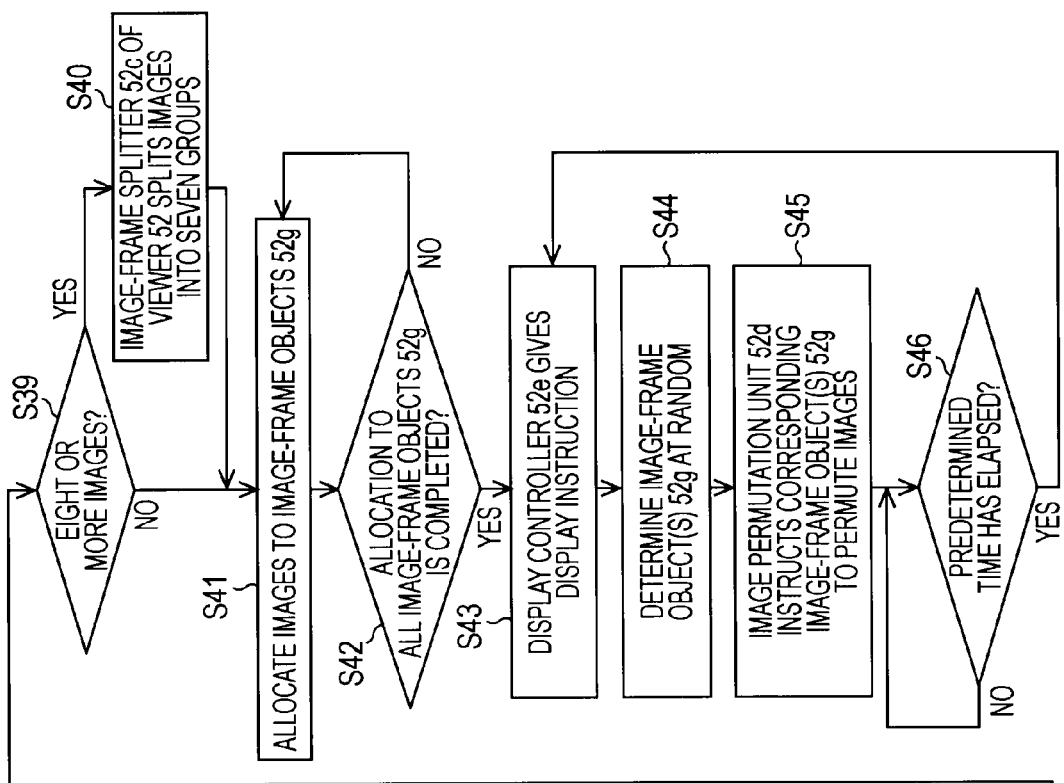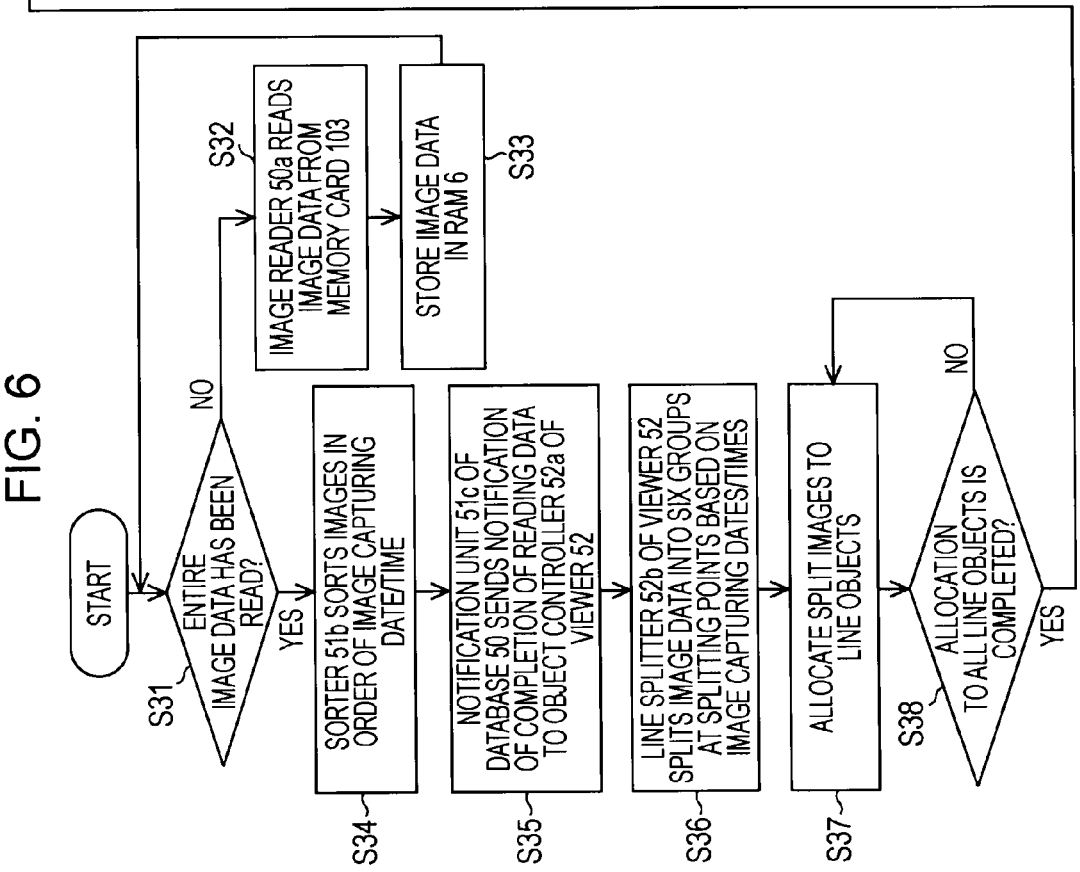

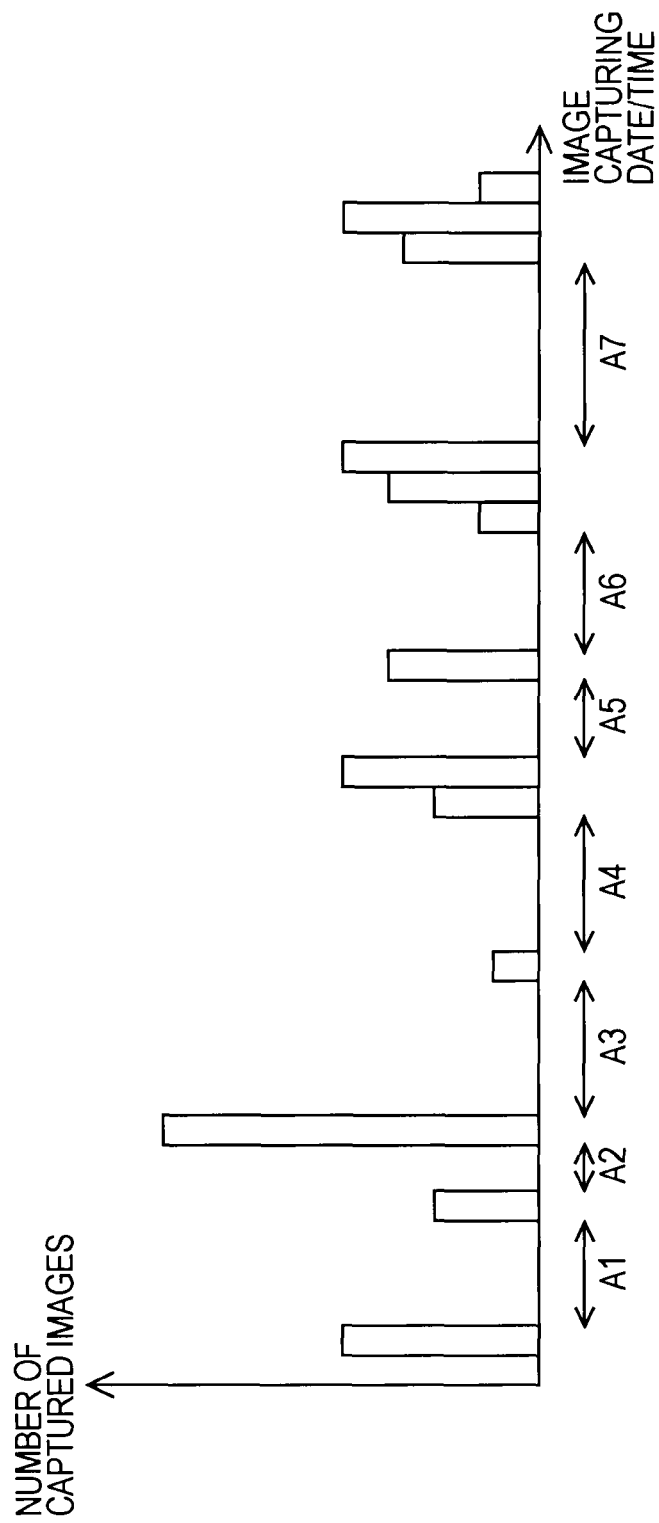

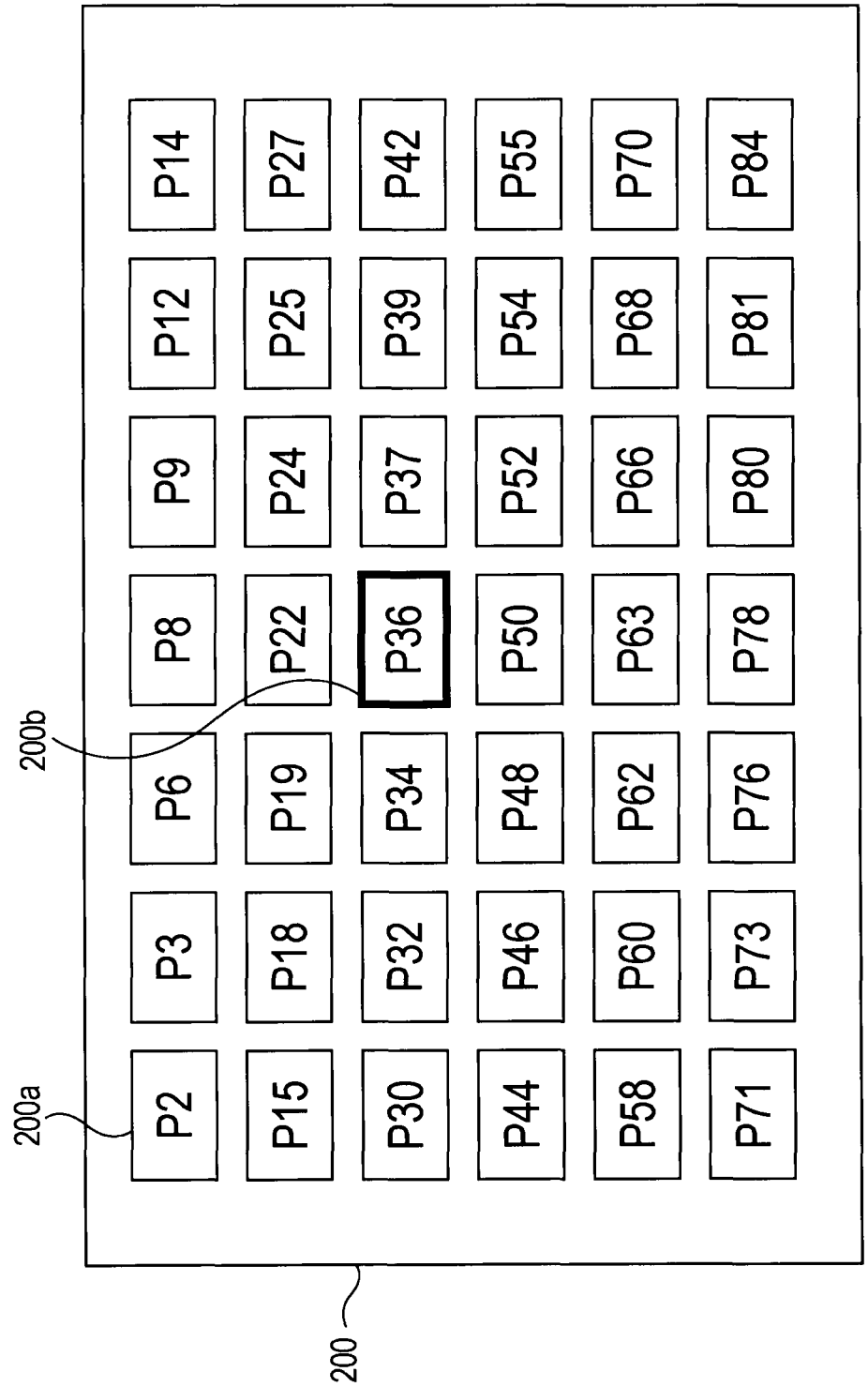

FIG. 16
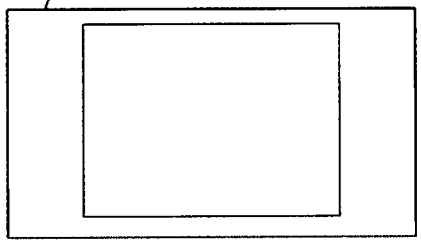
(a)
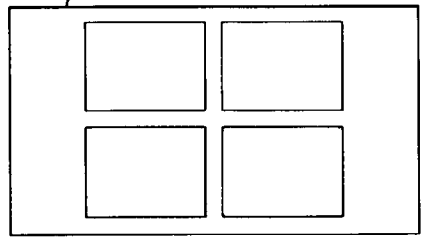
(b)
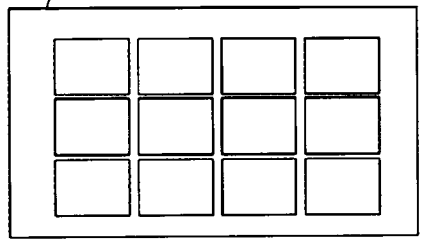
(c)
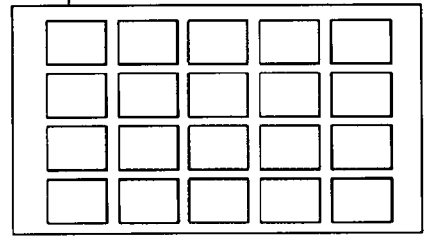
(d)
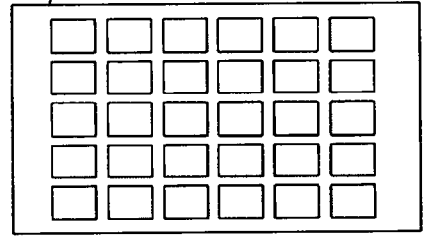
(e)
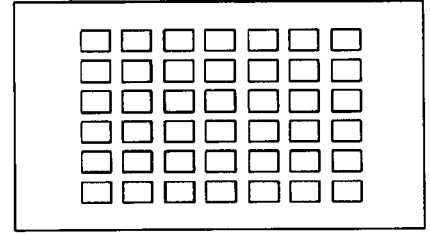
(f)
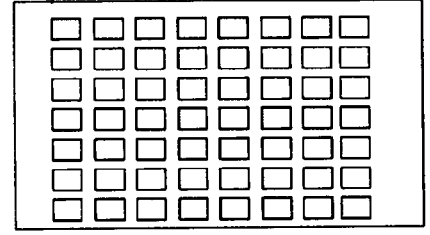
(g)

FIG. 19
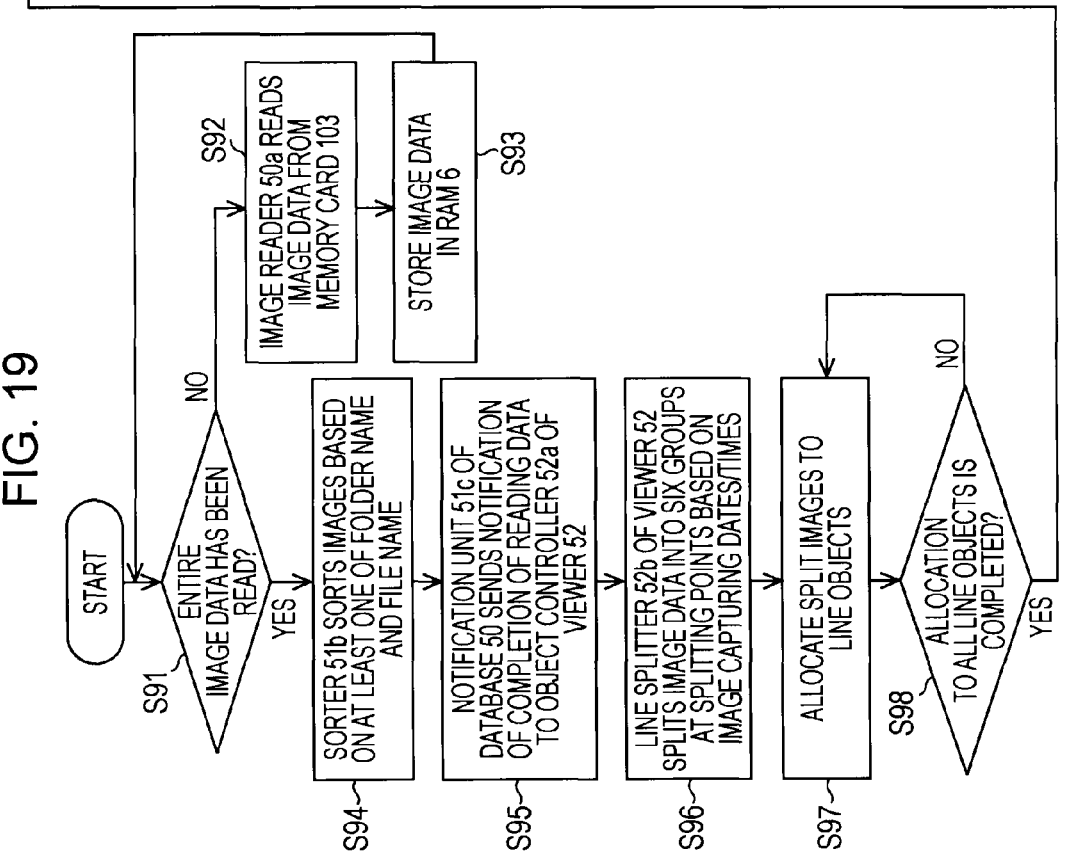
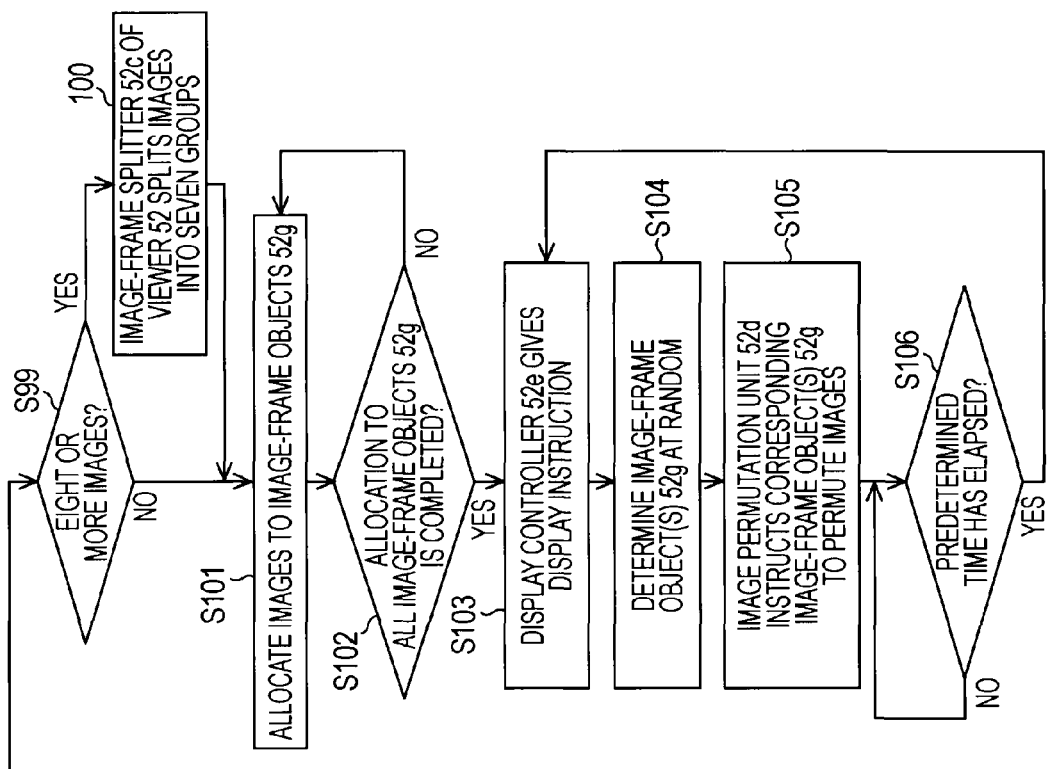

FIG. 24
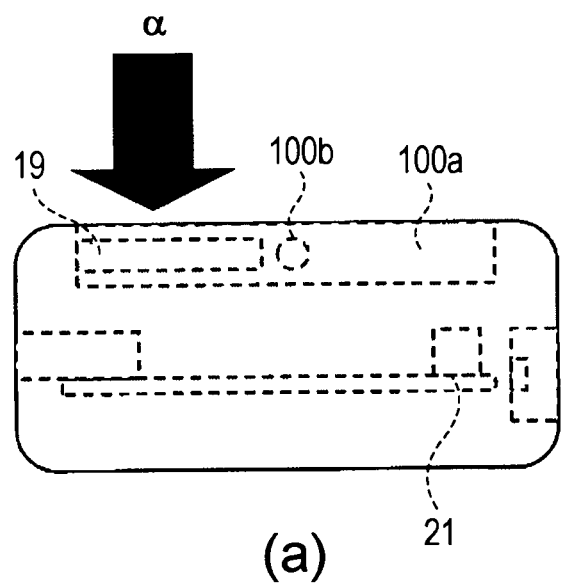
(a)
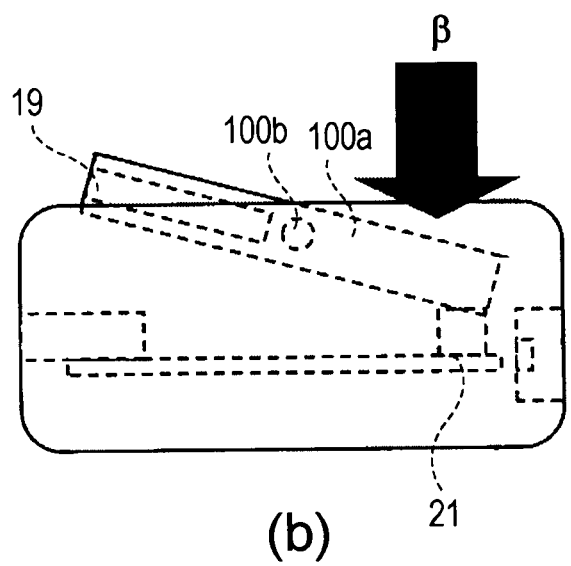
(b)

FIG. 25
(a)
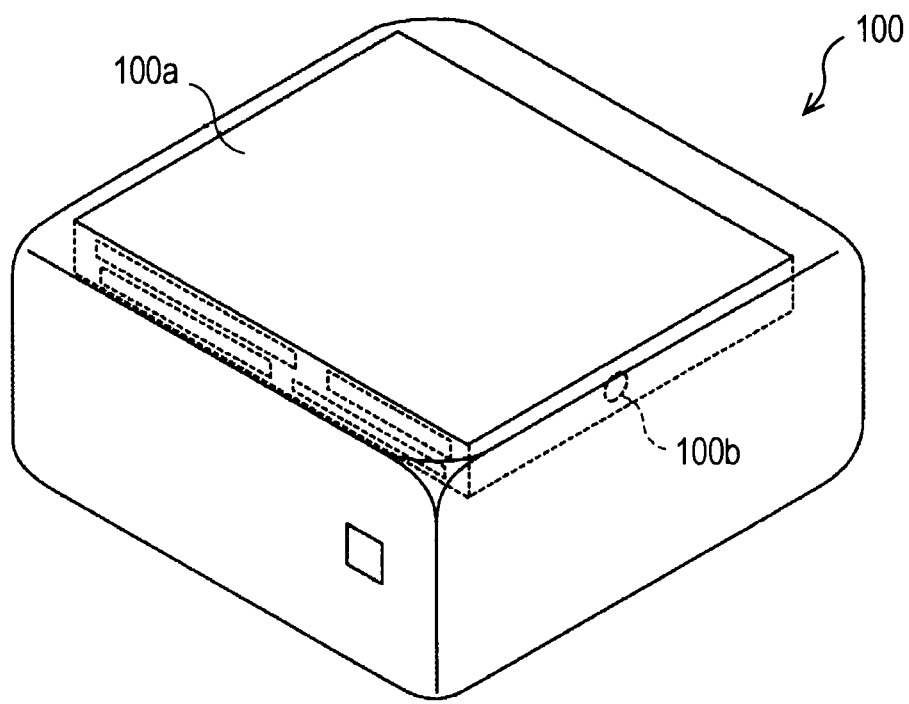
(b)
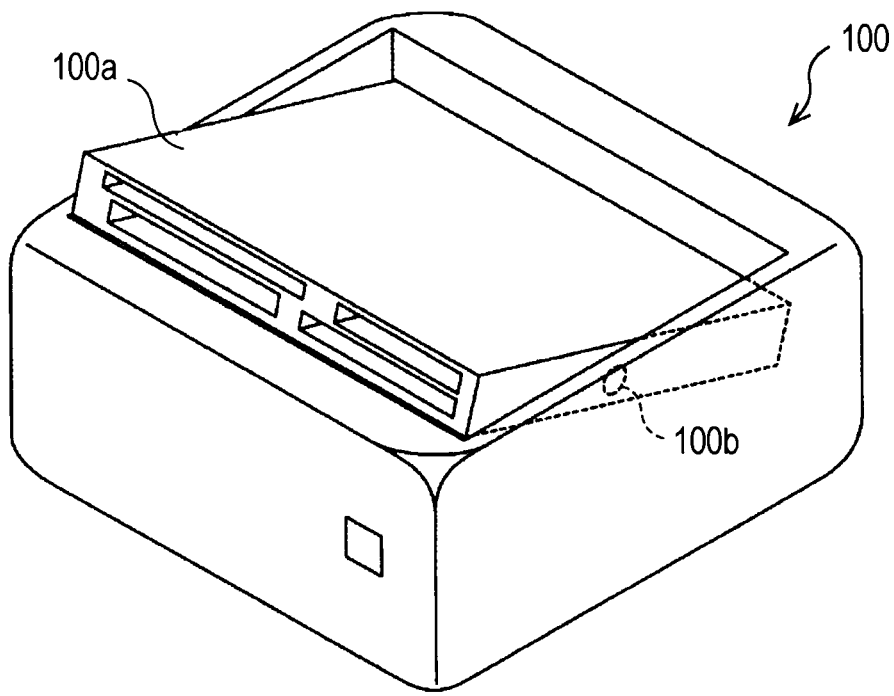

DISPLAY CONTROL APPARATUS, DISPLAY CONTROL METHOD, DISPLAY CONTROL PROGRAM, AND DISPLAY SYSTEM

TECHNICAL FIELD

The present invention relates to an apparatus and the like for performing reproduction control of, for example, thumbnail images, and more particularly relates to a display control apparatus, a display control method, a display control program, and a display system suitable for providing an overview of a plurality of thumbnail images.

BACKGROUND ART

As the capacity of flash memories or the like, which are recording media, has increased, image capturing apparatuses such as digital still cameras, digital video cameras, or the like have hitherto become capable of recording a large amount of image data or the like in one recording medium. In such circumstances, thumbnail images can be appropriately displayed in order to enable a user to easily check the captured images.

For example, Japanese Unexamined Patent Application Publication No. 2006-086612 discloses an information processing apparatus, which is applicable to a digital video camera, capable of appropriately displaying thumbnail images corresponding to chapters and searching for a desired scene or the like, without making a user perform a complicated operation, by displaying a moving image together with the thumbnail images.

However, in an apparatus with the function of displaying a list of thumbnail images according to the prior art, if there are more images than can be displayed on one screen, the images are displayed on a plurality of pages. It is thus necessary to sequentially scroll the pages with a user operation until a desired image is displayed.

Also, since the thumbnail images always have the same size, if the number of the images is small, an empty space where no images are displayed is not used. Moreover, the thumbnail images continue to be displayed in small display size, and a display region is not effectively used.

Furthermore, when the thumbnail images are displayed in line chronologically, as many displayable images as possible are sequentially displayed, starting from the earliest image capturing date/time, thus failing to provide an overview thereof.

DISCLOSURE OF INVENTION

Accordingly, it is an object of the present invention to realize display that can provide an overview of a group of thumbnail images in the case where the plurality of thumbnail images is displayed.

It is a further object to realize display suitable for finding a desired image by making it possible to provide an overview.

In a display control apparatus according to a first aspect of the present invention, an image-frame allocating unit allocates, when allocating images to be displayed to a predetermined number of image-frame objects, a plurality of images to at least some of the image-frame objects when the number of the images to be allocated to the individual image-frame objects exceeds the number of the image-frame objects. A display control unit controls display of the images allocated to the individual image-frame objects. Also, the display control unit performs, when the plurality of images are allocated to the image-frame objects, control so that all the images to be displayed are displayed within a certain time by switching the images to be displayed at predetermined time intervals.

In a display control method according to a second aspect of the present invention, when allocating images to be displayed to a predetermined number of image-frame objects, a plurality of images are allocated to at least some of the image-frame objects when the number of the images to be allocated to the individual image-frame objects exceeds the number of the image-frame objects. Also, display of the images allocated to the individual image-frame objects is controlled. Specifically, when the plurality of images are allocated to the image-frame objects, control is performed so that all the images to be displayed are displayed within a certain time by switching the images to be displayed at predetermined time intervals.

A program according to a third aspect of the present invention executes a display control method. In the display control method, when allocating images to be displayed to a predetermined number of image-frame objects, a plurality of images are allocated to at least some of the image-frame objects when the number of the images to be allocated to the individual image-frame objects exceeds the number of the image-frame objects. Also, display of the images allocated to the individual image-frame objects is controlled. Specifically, when the plurality of images are allocated to the image-frame objects, control is performed so that all the images to be displayed are displayed within a certain time by switching the images to be displayed at predetermined time intervals.

In a display system according to a fourth aspect of the present invention, an image-frame allocating unit allocates, when allocating images to be displayed to a predetermined number of image-frame objects, a plurality of images to at least some of the image-frame objects when the number of the images to be allocated to the individual image-frame objects exceeds the number of the image-frame objects. A display control unit controls display of the images allocated to the individual image-frame objects. Specifically, when the plurality of images are allocated to the image-frame objects, control is performed so that all the images to be displayed are displayed within a certain time by switching the images to be displayed at predetermined time intervals. Also, a display unit displays the images on the basis of control performed by the display control unit.

BRIEF DESCRIPTION OF DRAWINGS

FIG. 6 is a flowchart for describing the flow of a characteristic process performed by the display control apparatus according to the first embodiment of the present invention.

FIG. 7 is a conceptual diagram describing a method of splitting images by paying attention to gaps in image capturing date/time.

FIG. 8 is a diagram showing a display example of the display control apparatus according to the first embodiment of the present invention.

FIG. 16 Parts (a) to (g) of FIG. 16 are diagrams showing examples of a screen object.

FIG. 19 is a flowchart for describing the flow of a characteristic process performed by the display control apparatus according to the fourth embodiment of the present invention.

FIG. 24 Parts (a) and (b) of FIG. 24 are side views of the display control apparatus according to the first to fourth embodiments of the present invention.

FIG. 25 Parts (a) and (b) of FIG. 25 are perspective views of the display control apparatus according to the first to fourth embodiments of the present invention.

BEST MODES FOR CARRYING OUT THE INVENTION

Best modes for carrying out the present invention (hereinafter simply referred to as embodiments) will be described in detail below with reference to the drawings.

Figure 1:
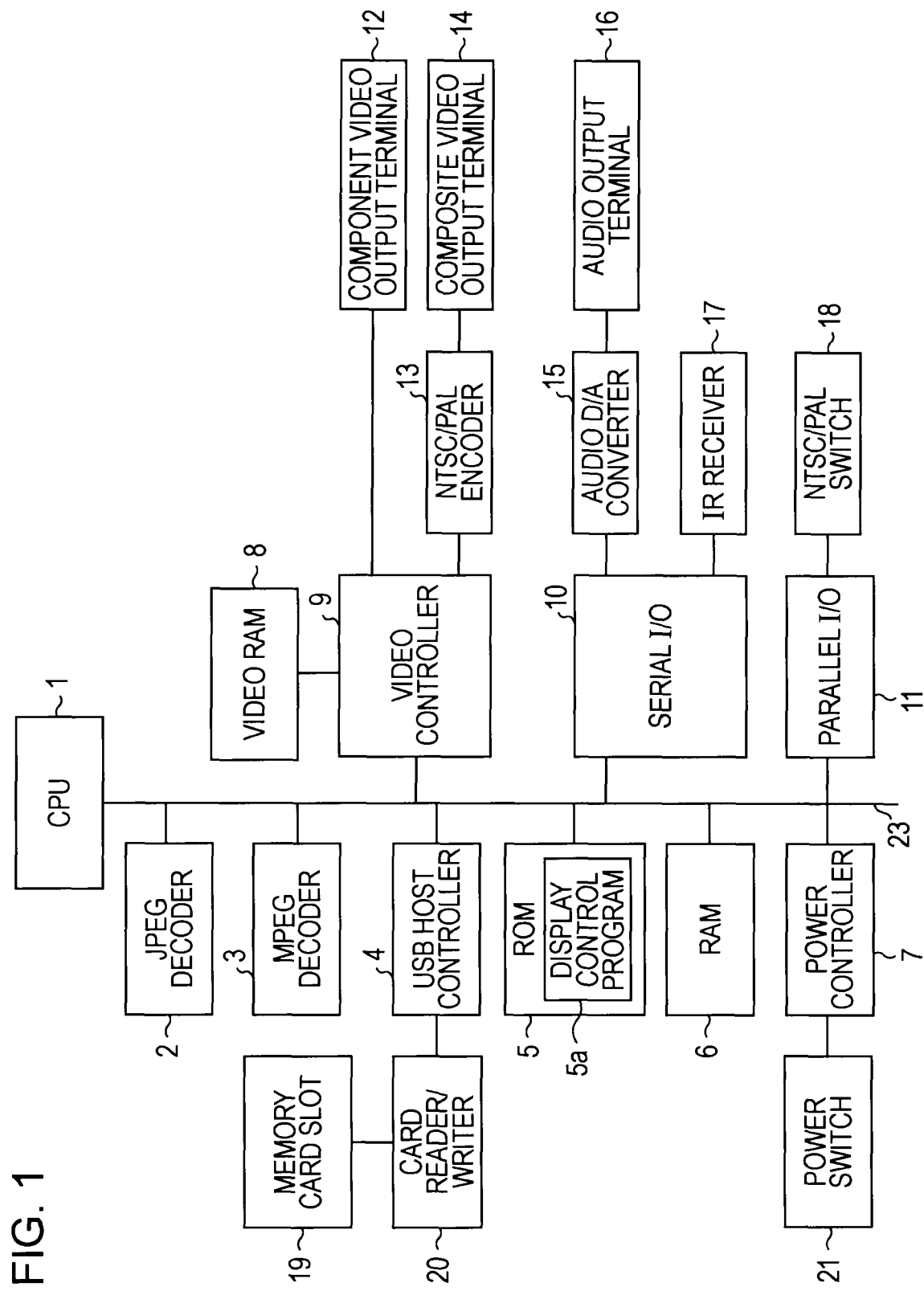
FIG. 1 is a block diagram of a display control apparatus common to first to fourth embodiments of the present invention.

The configuration of a display control apparatus common to the embodiments of the present invention is shown in FIG. 1 and is described.

A CPU (Central Processing Unit) 1 that takes charge of control of the entirety of the display control apparatus is connected via a local bus 23 to a JPEG (Joint Photographic Experts Group) decoder 2, an MPEG (Moving Picture Experts Group) decoder 3, a USB (Universal Serial Bus) host controller 4, a ROM (Read Only Memory) 5, a RAM (Random Access Memory) 6, a power controller 7, and a video controller 9 so that the CPU 1 can freely communicate therewith. A video RAM 8 is connected to the video controller 9. Also, the CPU 1 is electrically connected via the local bus 23 and a serial I/O (Input/Output) 10 to an audio D/A (Digital/Analog) converter 15 and an IR (Infrared Radiation) receiver 17. An output of the audio D/A converter 15 is connected to an audio output terminal 16.

The CPU 1 is also electrically connected via the local bus 23 and a parallel I/O 11 to an NTSC/PAL (National Television System Committee/Phase Alternating by Line) switch 18. An output of the video controller 9 is connected to a component video output terminal 12 and is connected via an NTSC/PAL encoder 13 to a composite video output terminal 14. The USB host controller 4 is electrically connected to a card reader/writer 20 for reading/writing data (e.g., image data) from/to a memory card mounted in a memory card slot 19. The power controller 7 is electrically connected to a power switch 21.

The operation of each of the elements of the above-described configuration will now be described in detail below.

In the above-described configuration, a display control program (hereinafter simply referred to as a "program") 5a is stored in the ROM 5. The CPU 1 reads the program 5a stored in the ROM 5 and performs processing in accordance with the program 5a. The RAM 6 is appropriately used as a work area for the processing in accordance with the program 5a and to save selected image data or the like. When a memory card is inserted into the memory card slot 19, the card reader/writer 20 detects this state and sends a notification of this state to the CPU 1 via the USB host controller 4. Upon receipt of this notification, the CPU 1 sends a control signal to the card reader/writer 20 via the USB host controller 4 and gives an instruction to read image data or the like from the memory card. Upon receipt of the instruction, the card reader/writer 20 reads the image data or the like from the memory card inserted in the memory card slot 19 and sends the image data to the CPU 1 via the USB host controller 4 and the local bus 23.

The CPU 1 determines whether the sent image data relates to still images or a moving image. Then, when the image data is image data relating to still images, the CPU 1 decodes the image data, which has been compressed and encoded, using the JPEG decoder 2, and expands the decoded image data in the video RAM 8 via the video controller 9. On this occasion, as will be described in detail later, the CPU 1 generates thumbnail images of individual pieces of image data on the basis of the program 5a stored in the ROM 5, allocates the thumbnail images to individual objects, and expands the image data in the video RAM 8 so that these thumbnail images can be displayed in a format in which an overview thereof can be provided within a certain time interval.

In contrast, when the image data is image data relating to a moving image, the CPU 1 extracts and decodes one frame (picture) per predetermined unit using the MPEG decoder 3. For example, when the image data has been compressed and encoded in the MPEG-2 format, the moving image, which has 30 frames per second, has been compressed and encoded in units of GOPs (Groups of Pictures), each GOP being consisting of successive 15 frames. One frame per GOP may be decoded. The decoded image data is expanded in the video RAM 8 via the video controller 9. On this occasion, as will be described in detail later, the CPU 1 generates thumbnail images of individual pieces of the extracted image data on the basis of the program 5a stored in the ROM 5, allocates the thumbnail images to individual objects, and expands the image data in the video RAM 8 so that all these thumbnail images can be displayed in a format in which an overview thereof can be provided.

Further, it is assumed that "image data" in the following description conceptually includes, besides image data read from a memory card 103, image data relating to a thumbnail image generated by converting the number of pixels by decimating the number of pixels of the image data.

In accordance with an instruction from the CPU 1, the video controller 9 outputs content of the video RAM 8. In doing so, a component video output is output from the component video output terminal 12, and a composite video output is converted into a composite video signal using the NTSC/PAL encoder 12 and thereafter the composite video signal is output from the composite video output terminal 14.

In the case where the NTSC/PAL switch 18 is turned on or off, a state signal is sent to the CPU 1 side via the parallel I/O 11, and the CPU 1 detects switching between NTSC/PAL on the basis of the state signal. That is, the user turns on/off the NTSC/PAL switch 18, thereby appropriately switching between NTSC and PAL of a composite video output in accordance with the situation.

Here, the component video output terminal 12 is a terminal that outputs a Y/CB/CR signal to the outside and can send a component color-difference signal to a display apparatus (e.g., a CRT monitor or a projector) without converting it. In this case, it is preferable that the component video output terminal 12 be directly connected to a component (color-difference) input terminal of the display apparatus.

In contrast, the composite video output terminal 14 outputs a composite video signal, that is, a composite signal (VBS) generated by combining a color signal and a luminance signal. The composite video signal can be transferred using one cable. The composite signal can be separated into the color signal and the luminance signal by passing the composite signal through a Y/C separation circuit on the display apparatus side.

A music file stored in the ROM 5 or the RAM 6 is, using the CPU 1, read, decoded, sent via the serial I/O 10 to the audio D/A converter 15, converted into analog signals, and then output from the audio output terminal 16. Therefore, at the time of the above-described image reproduction, music or recorded sounds can also be appropriately output.

The power switch 21 controls the power controller 7 and controls on/off of feeding power to all the electronic components. The IR receiver 17 receives infrared radiation emitted from a remote control device (hereinafter simply referred to as a remote control), converts the infrared radiation into a digital signal, and then stores the digital signal in the RAM 6. The CPU 1 analyzes the digital signal and determines the operation of the apparatus main body.

Figure 2:
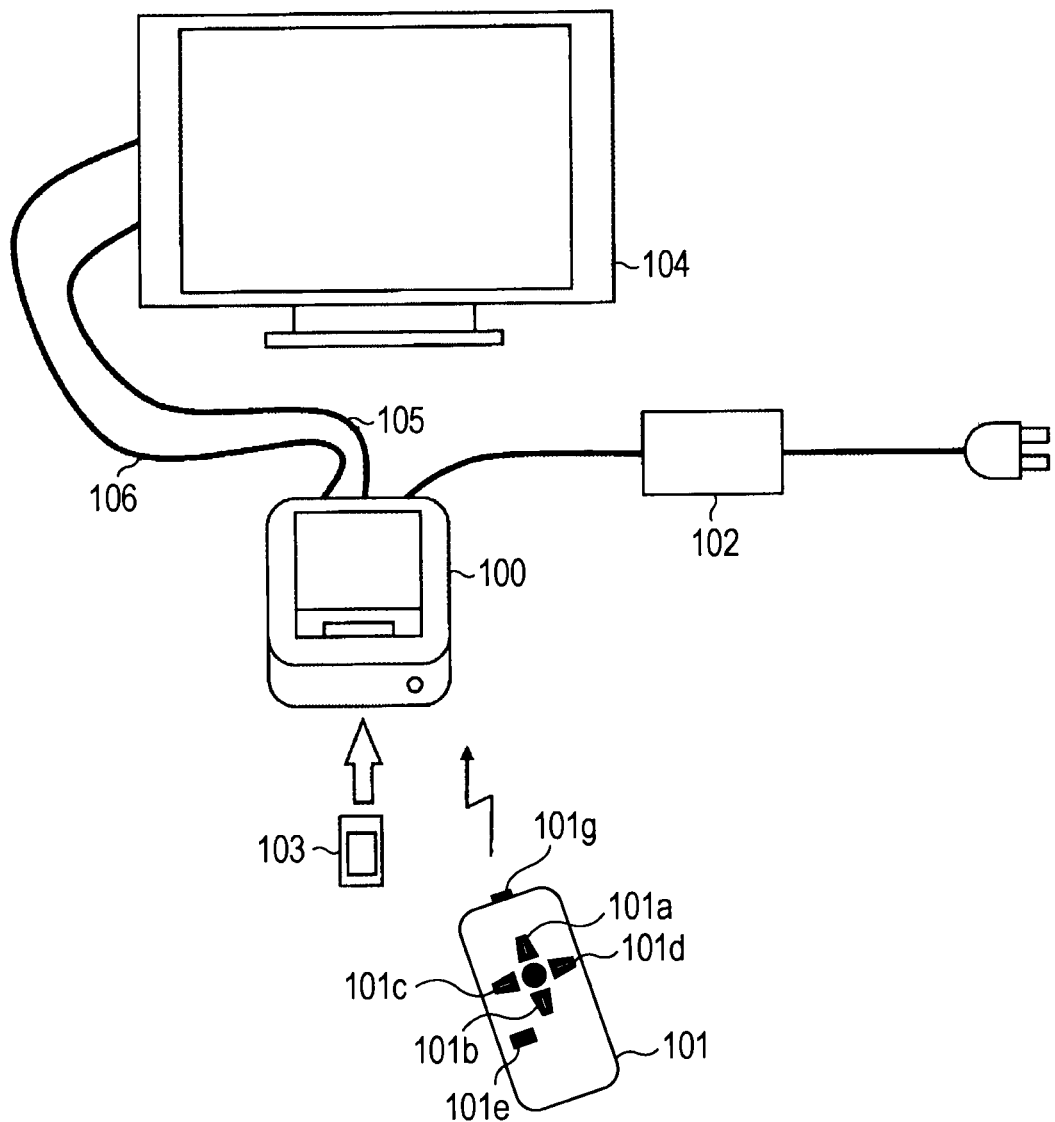
FIG. 2 is a diagram of a display system adopting the display control apparatus common to the first to fourth embodiments of the present invention.

Next, the configuration of a display system adopting the display control apparatus according to the embodiment of the present invention is shown in FIG. 2 and is described.

As shown in FIG. 2, the display system includes a display control apparatus 100, a remote control 101, an AC adapter 102, and a display apparatus 104 implemented by an LCD (Liquid Crystal Display) or the like. The memory card 103 can be mounted in the display control apparatus 100. That is, the memory card 103 is mounted in the memory card slot 19 shown in FIG. 1, which has been described above.

The display control apparatus 100 is connected to the display apparatus 104 via a component video cable 105 and an AV cable 106. The AC adapter 102 receives power from an AC power supply, converts the power into a DC current, and supplies the power to the display apparatus 100.

The remote control 101 is equipped with an up button 101a, a down button 101b, a left button 101c, a right button 101d, a select button 101f, and a thumbnail button 101e.

The function of each button will be described later. With the up, down, left, and right buttons 101a to 101d, instructions for movement or the like of a cursor on a screen are given, and the operation is concluded with the select button 101f. By pressing the thumbnail button 101e, the screen is switched to display thumbnails. An IR emitter 101g is provided at a tip portion of the remote control 101. When the various buttons 101a to 101f of the remote control 101 are pressed, signals are determined by a one-chip microcomputer included in the remote control, and these signals are output using the IR emitter 101g. The display control apparatus 100 receives this infrared radiation at the IR receiver 17 and performs the foregoing processing.

Figure 3:
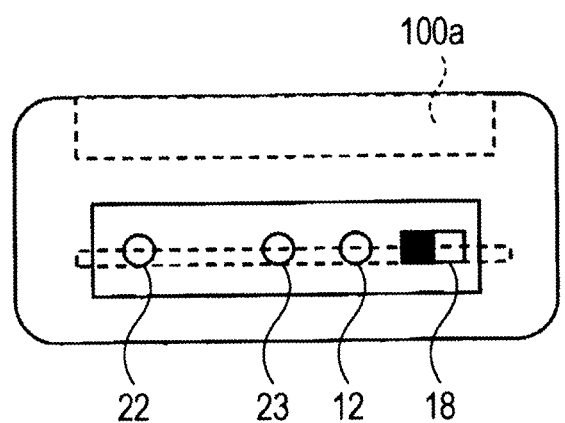
FIG. 3 is a back view of the display control apparatus common to the first to fourth embodiments of the present invention.

Here, FIG. 3 shows a back view of the display control apparatus 100.

On the back of the display control apparatus 100, an AC adapter connector 22, an AV mini-jack 23 (corresponding to a composite video output terminal and an audio output terminal), the component video output terminal 12, and the NTSC/PAL switch 18 are disposed. The AC adapter 102 is connected to the AC adapter connector 22 of the display control apparatus 100. The AC adapter connector 22 is a connector for connecting the AC adapter 102 to the apparatus 100. Power is supplied to the display control apparatus 100 via the connector 22. The AV mini-jack 23 is connected to the display apparatus 104 via the AV cable 106, and sounds and the like are output. By connecting a composite video output to a video terminal on the display apparatus 104 side, even when the display apparatus 104 has no component input, the display apparatus 104 can output a composite output in NTSC or the like.

In the case of the display apparatus 104 on which a component input terminal is disposed, when the component video cable 105 is connected to the apparatus 100 via the component video output terminal 12, the display apparatus 104 can display a more beautiful image than that in the case of composite connection.

Further, the display apparatus 104 realizes, for example, a display function.

Next, a first embodiment of the present invention will be described.

Hereinafter, with reference to the conceptual diagram of FIG. 4 and the flowchart of FIG. 5, a characteristic process performed by the display control apparatus according to the first embodiment of the present invention will be described in detail.

Figure 4:
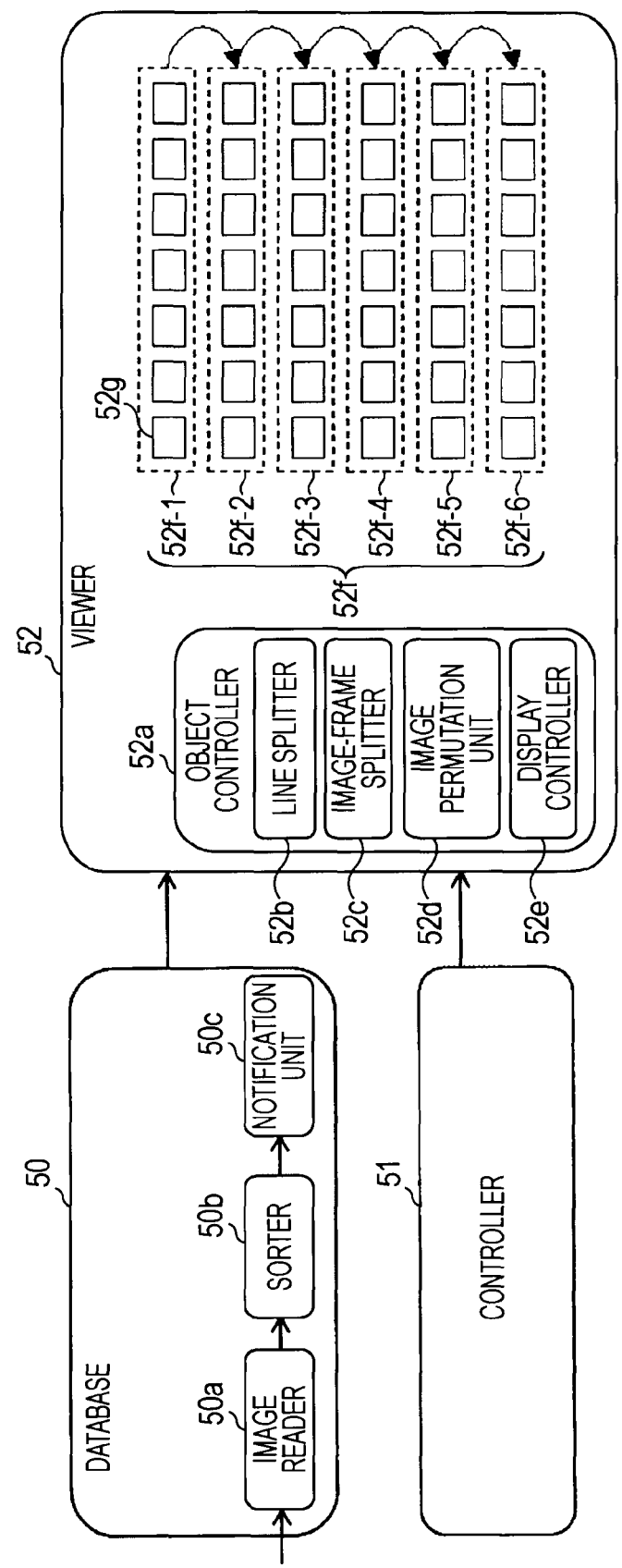
FIG. 4 is a diagram conceptually showing logical functions of the display control apparatus according to the first embodiment of the present invention.
Figure 5:
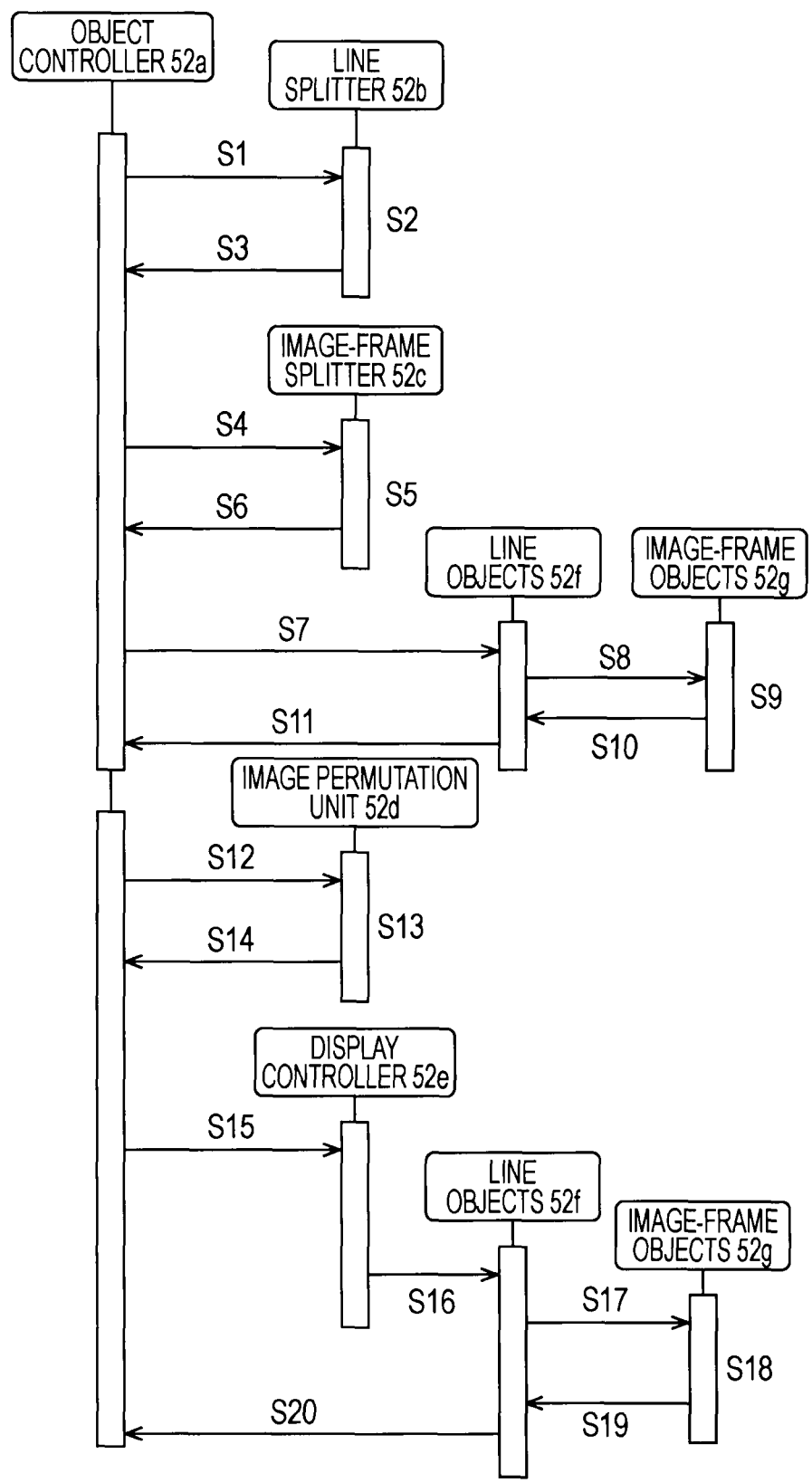
FIG. 5 is a sequence diagram showing exchanges among an object controller, line objects, and image-frame objects of a viewer.

FIG. 4 conceptually shows logical functions of the CPU 1.

The CPU 1 of the display control apparatus reads and executes the program 5a stored in the ROM 5, thereby functioning as a database 50, a controller 51, and a viewer 52, such as those shown in FIG. 4. More specifically, the database 50 is equipped with, as functions, at least an image reader 50a, a sorter 50b, and a notification unit 50c. The viewer 52 is equipped with, as a function, at least an object controller 52a. More specifically, the viewer 52 is equipped with, as functions, at least a line splitter 52b, an image-frame splitter 52c, an image permutation unit 52d, and a display controller 52e.

Further, in the first embodiment, the example in which six line objects 52f (52f-1 to 52f-6) are provided as line objects, and each line object is provided with seven image-frame objects 52g has been illustrated. However, the first embodiment is not limited to this example. The image-frame objects 52g are controllable to display a plurality of thumbnail images.

Here, objects are based on the so-called object oriented idea. Objects have a functional hierarchical structure including the line objects 52f and the image-frame objects 52g. That is, the line objects 52*f* reside in an upper layer, and the image-frame objects 52*g* reside in a lower layer therebelow.

Upon receipt of thumbnail images allocated to each line, the line objects 52*f* further allocate these to the individual image-frame objects 52*g*, and instruct the image-frame objects 52*g* to display the thumbnail images. In fact, the line objects 52*f* supervise allocating thumbnail images to the image-frame objects 52*g* and instructing the image-frame objects 52*g* to display the thumbnail images.

In contrast, the image-frame objects 52*g* are different from the line objects 52*f* in terms of software. The image-frame objects 52*g* manage the display positions of thumbnail images and the like on a one-piece-by-one-piece basis. Further, under such management, the image-frame objects 52*g* perform display control of the thumbnail images on the basis of the display instruction from the line objects 52*f*.

Hereinafter, display control under the functional hierarchical structure is further described in detail with reference to the sequence diagram of FIG. 5. Here, reference to FIG. 4 is made as needed.

First, display control of thumbnail images is performed.

That is, the object controller 52*a* instructs the line splitter 52*b* to split the thumbnail images into the number of the line objects 52*f* (step S1). Upon receipt of this instruction, the line splitter 52*b* splits the thumbnail images into the number of the line objects 52*f* (step S2). Then, the line splitter 52*b* gives a notification of completion of splitting to the object controller 52*a* (step S3).

Subsequently, the object controller 52*a* instructs the image-frame splitter 52*c* to further split the thumbnail images so as to be allocated to the image-frame objects 52*g* (step S4). Upon receipt of this instruction, the image-frame splitter 52*c* splits the thumbnail images so as to allocate the thumbnail images to the image-frame objects 52*g* (step S5). Then, the image-frame splitter 52*c* gives a notification of completion of splitting to the object controller 52*a* (step S6).

Next, the object controller 52*a* instructs the line objects 52*f* to perform display control of the split thumbnail images (step S7). Upon receipt of this instruction, the line objects 52*f* instruct the image-frame objects 52*g* to perform display control of the thumbnail images (step S8). Then, the image-frame objects 52*g* control the display positions of the allocated thumbnail images and the like and perform display control (step S9). Then, the image-frame objects 52*g* give notifications of completion of display control to the line objects 52*f* (step S10). The line objects 52*f* further give notifications of completion of display control to the object controller 52*a* (step S11). With the foregoing, a series of display controls relating to display control of thumbnail images is completed.

Next, thumbnail images to be displayed are permuted at, for example, predetermined time intervals.

That is, the object controller 52*a* instructs the image permutation unit 52*d* to permute display of the thumbnail images allocated to the image-frame objects 52*s* (step S12). Upon receipt of this instruction, the image permutation unit 52*d* establishes a rule for permuting the thumbnail images (step S13) and gives a notification of completion to the object controller 52*a* (step S14).

Subsequently, the object controller 52*a* instructs the display controller 52*e* to perform display control relating to image permutation (step S15). Upon receipt of this instruction, the display controller 52*e* instructs the line objects 52*f* to permute the thumbnail images to be displayed (step S16). Upon receipt of this instruction, the line objects 52*f* instruct the image-frame objects 52*g* to permute the thumbnail images (step S17). Upon receipt of this instruction, the image-frame objects 52*g* permute the thumbnail images to be displayed (step S18) and give notifications of completion to the line objects 52*f* (step S19). The line objects 52*f* further give notifications of completion of permutation of the thumbnail images to the object controller 52*e* (step S20). With the foregoing, a series of display controls relating to permutation of thumbnail images is completed.

Further, the image reader 50*a*, the sorter 50*b*, the line splitter 52*b*, the image-frame splitter 52*c*, the image permutation unit 52*d*, and the display controller 52*e* realize, for example, an image reading function, a sorting function, a line splitting function, an image-frame splitting function, an image permutation function, and a display control function, respectively.

Hereinafter, a display control process will now be described more specifically in detail with reference to the flowchart of FIG. 6.

Further, all/some of the individual steps constituting the process correspond to a display control method.

When the memory card 103 is mounted into the memory card slot 19 and the card reader/writer 20 detects this mounting, a state signal is sent to the CPU 1 via the USB host controller 4. When the CPU 1 recognizes the mounting on the basis of the state signal, the CPU 1 reads the program 5*a* stored in the ROM 5 on the basis of an operating system and starts the process.

When the process is started, the image reader 50*a* of the database 50 determines whether all pieces of image data have been read (step S31). Here, the determination is made on the basis of, for example, the state of a predetermined flag. At the time the process enters step S31 for the first time, step S31 is branched to No. The image reader 50*a* reads image data from the memory card 103 inserted in the memory card slot 19 (step S32) and stores the image data in the RAM 6 (step S33). This reading and storing processing, that is, reading, is performed on all pieces of image data (steps S31 to S33).

This loop of steps S31 to S33 is repeated, and, when the reading of all the pieces of image data is completed (step S31 is branched to Yes), the sorter 50*b* of the database 50 sorts the image data stored in the RAM 6 in order of image capturing date/time (step S34). That is, the image data may be sorted on the basis of either the image capturing date or image capturing time.

When the reading and sorting of all the pieces of image data are completed, the notification unit 50*c* of the database 50 gives a notification of completion of reading the data to the viewer 52 (step S35).

Upon receipt of this notification, the line splitter 52*b* of the viewer 52 detects the image capturing dates/times of the individual pieces of image data and splits the images (thumbnail images in this example; the same applies hereinafter) into six groups in descending order of intervals in which a large difference in image capturing date/time serves as a splitting point (step S36).

The splitting is described using, for example, the conceptual diagram of FIG. 7. In this example, the axis of ordinate represents the number of captured images, and the axis of abscissas represents the image capturing date/time. Among intervals in which there is a difference in image capturing date/time (A1 to A7), splitting is done using the large ones serving as splitting points.

Accordingly, the split images are sequentially allocated to the line objects 52*f* in ascending order of image capturing date/time (step S37).

Further, the method of uniformly splitting images in ascending order of image capturing date/time and allocating the images to the line objects 52*f* is described later.

The line splitter 52b determines whether allocation to all the line objects is completed, and repeats the processing in step S37 until the entire allocation is completed (step S38).

When allocation to all the line objects is completed (step S38 is branched to Yes), the image-frame splitter 52c of the viewer 52 determines whether there are eight or more images allocated to each of the line objects 52f-1 to 52f-6 (step S39).

When the image-frame splitter 52c determines in step S39 that there are eight or more images (step S39 is branched to Yes), these images do not fit into one line. Thus, the images are split into seven groups, which is the number of images that can be displayed in one line (step S40). The images are allocated to the image-frame objects on a line-object-by-line-object basis (step S41).

Further, if the number of pieces of image data is not divisible by 7, in step S41, the image-frame splitter 52c randomly allocates the remainder to the image-frame objects 52g one at a time so as to avoid disproportion. That is, when images whose number exceeds the number of images that fit into one line are allocated to the image-frame objects 52g included in each line object 52f, the exceeding images are disposed at random. The line objects reallocate the exceeding images to the line objects so as to avoid overlap. In accordance with the determined number of allocated images, the line objects 52f reallocate the images to the individual image-frame objects 52g.

Also, when images relating to a plurality of images are allocated to each of the image-frame objects, the image-frame splitter 52c gives a priority level to each image so that the images are displayed in ascending order of image capturing date/time. A complementary description of the priority level is given. For example, the number of images is divided by 7 to obtain a remainder, and seven image-frame objects 52g are randomly selected. Note that these image-frame objects 52g are image-frame objects other than those already selected. Further, this selection is repeated for the value of the remainder obtained by dividing the number of images by 7, thereby giving priority levels. However, the method is not limited thereto.

In contrast, when the number of images allocated to each line object is 7 or less, the images can fit into one line. Thus, the images are allocated to the image-frame objects 52g so that the images can be displayed nearer to the center (step S41). In this manner, the image-frame splitter 52c determines whether allocation of the images to all the image-frame objects 52g is completed (step S42).

That is, the image-frame splitter 52c repeats the processing in step S41 until allocation of all the images to the image-frame objects 52g is completed. When it is determined that allocation of all the images is completed (step S42 is branched to Yes), the display controller 52e gives a display instruction (step S43). Here, in terms of hardware, in response to the instruction from the display controller 52e, image data to be displayed is rendered in the video RAM, and, using the video controller 9, a component video output signal is output from the component video output terminal 12. Alternatively, after the image data is converted into a composite video signal using the NTSC/PAL encoder 13, the composite video output signal is output from the composite video output terminal 14.

Subsequently, the image permutation unit 52d of the object controller 52a of the viewer 52 determines an image-frame object(s) at random (step S44) and instructs the corresponding image frame object(s) 52g to permute the images (step S45). On this occasion, if there is no more new image in order of image capturing date/time, the oldest images may be displayed again in order of image capturing date/time. It is then determined whether a predetermined time has elapsed (step S46). When the predetermined time has elapsed, the flow returns to step S43, and the foregoing processing is performed. That is, the processing in steps S43 to S46 is repeated at predetermined time intervals. Further, when switching from one image to another, if there is no more new image, the oldest image may be displayed again.

Also, the predetermined time used here may be a fixed time. Alternatively, it may be set so that all images are displayed within a certain time, and it may be determined that all images may be displayed within a certain time. Alternatively, the predetermined time may be randomly set for each process.

Also, for example, in the case where the memory card 103 is removed from the memory card slot 19 or an operation is entered through the remote control, the controller 51 instructs the object controller 52a of the viewer 52 to perform interruption processing. In this case, the object controller 52a performs display control in accordance with this instruction.

A configuration example of images displayed on the display apparatus 104 using the foregoing process is as shown in FIG. 8. As shown in the diagram, forty-two thumbnail images in total are displayed in six lines, each line including seven images, in image frames 200a on a thumbnail screen 200.

In performing this display, thumbnail images are split into six groups, which is the number of the line objects, on the basis of image capturing date/time. Furthermore, the thumbnail images are allocated to image frames of each line object. Reference Pn (n is a natural number) shown in each image frame denotes the order of image capturing date/time.

A cursor 200b is displayed at one of the image frames. By operating the up button 101a or the down button 101f of the remote control 101, the cursor itself can be moved to another thumbnail image. More particularly, pressing the up button 101a once moves the cursor to the center of a line above the current line, and pressing the down button 101f once moves the cursor to the center of a line below the current line.

Moreover, by pressing the left button 101c or the right button 101d of the remote control 101 on the thumbnail screen 200, when the left button 101c is pressed while the position of the cursor 200b is not changed, all the thumbnail images in that line are moved one step to the right, and, when the right button 101d is pressed, all the thumbnail images in that line are moved one step to the left.

Figure 9:
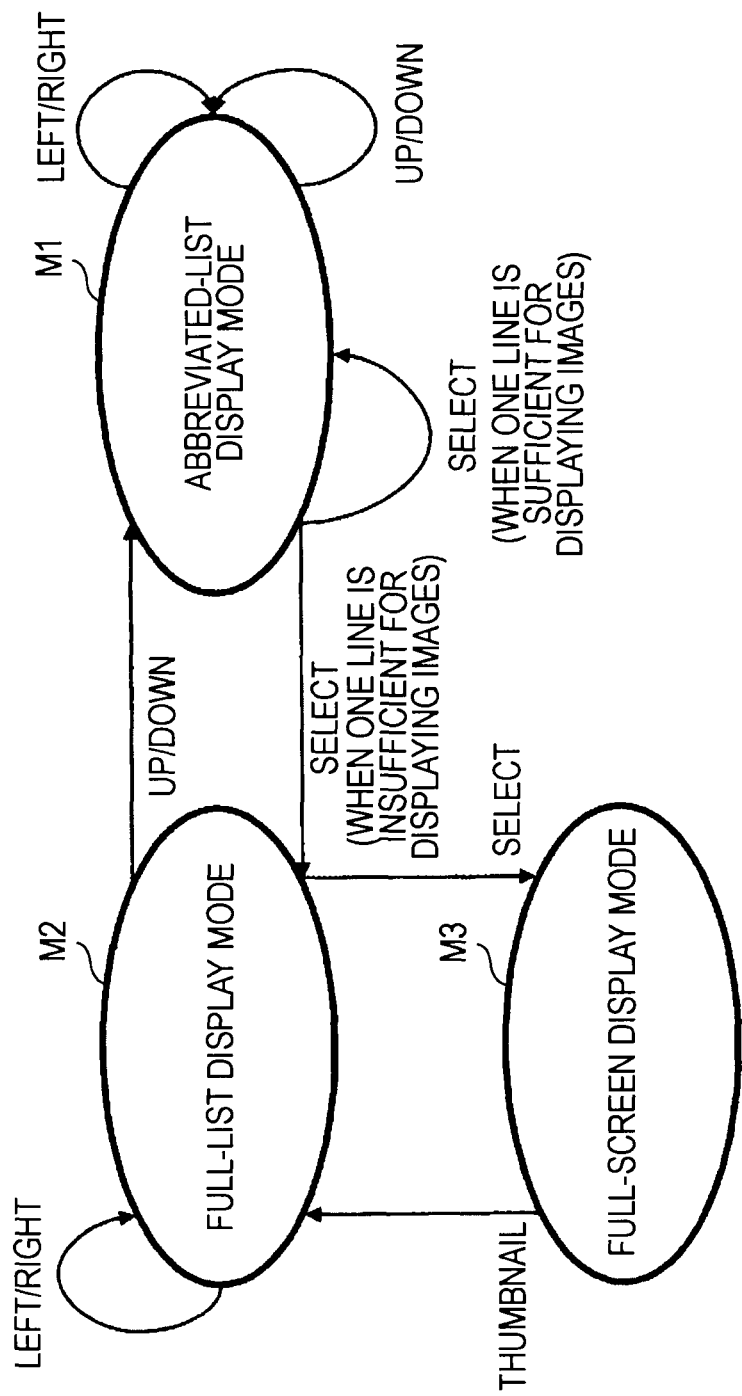
FIG. 9 is a conceptual diagram for describing display mode transition.

Next, display mode switching is described in detail with reference to the conceptual diagram of FIG. 9.

Further, in FIG. 7, "left/right" means that the left button 101c or the right button 101d of the remote control 101 has been pressed; "up/down" means that the up button 101a or the down button 101b of the remote control 101 has been pressed; "select" means that the select button 101f of the remote control 101 has been pressed; and "thumbnail" means that the thumbnail button 101e of the remote control has been pressed.

The display previously shown in FIG. 8 is in an abbreviated-list display mode M1.

In the case where the select button 101f is pressed under a state in the abbreviated-list display mode M1, when images could be displayed in one line, the state is maintained as it is. In contrast, when images could not be displayed in one line, the mode is switched to a full-list display mode M2. In the full-list display mode M2, in a line in which the cursor is located, an image based on the oldest image data among pieces of image data allocated to an image-frame object in which the cursor is located is displayed at the cursor position, and pieces of image data are consecutively displayed from left to right on either side of the cursor position in ascending order of image capturing date/time.

Figure 10:
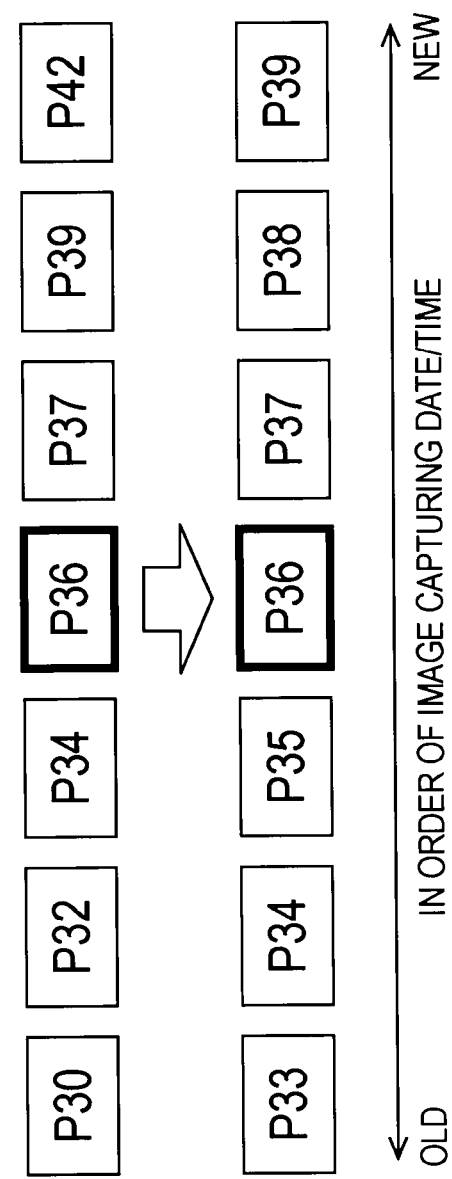
FIG. 10 is a conceptual diagram for describing switching of images in image frames.

More particularly, for example, as shown in the conceptual diagram of FIG. 10, among pieces of image data allocated to an image-frame object in which the cursor is located, the oldest image P36 is displayed (there will be no updating since the image P36 is the oldest in this example). On the basis of this image frame as a reference point, images P35, P34, and P33 are sequentially displayed so that those with old image capturing dates/times are arranged on the left-hand side, and images P37, P38, and P39 are sequentially displayed so that those with new image capturing dates/times are arranged on the right-hand side.

Further, this processing is realized by permuting pieces of image data allocated to the image-frame objects in the line object using the image permutation unit 52*d* of the object controller 52*a* of the viewer 52 upon receipt of an instruction from the controller 51. Moreover, in the case where image data to be displayed has already been allocated to an image-frame object, processing may be performed to increase the priority of this image data so that, among pieces of allocated image data, this image data can be displayed.

In the case where the up button 101*a* of the remote control 101 is pressed under a state in the full-list display mode M2, the cursor is moved to a line above the current line unless the cursor is not at the top, and the display is changed to a display format in the abbreviated-list display mode M1. Similarly, in the case where the down button 101*b* of the remote control 101 is pressed, the cursor is moved to a line below the current line unless the cursor is not at the bottom, and the display is changed to a display format in the abbreviated-list display mode M1.

Further, in the case where the select button 101*f* is pressed in the full-list display mode M2, the display mode is changed to a full-screen display mode M3 in which an image displayed within the cursor is enlarged and only this image, which is large, is displayed on the screen. Moreover, in the case where the thumbnail button 101*e* is pressed in the full-screen display mode M3, the display mode is changed to the full-list display mode M2.

Further, even if no button operation, such as that described above, is performed when the abbreviated-list display mode M1 is selected, the image permutation unit 52*d* of the viewer switches display images in the image-frame object 52*g* to which a plurality of images are allocated at predetermined intervals.

Figure 11:
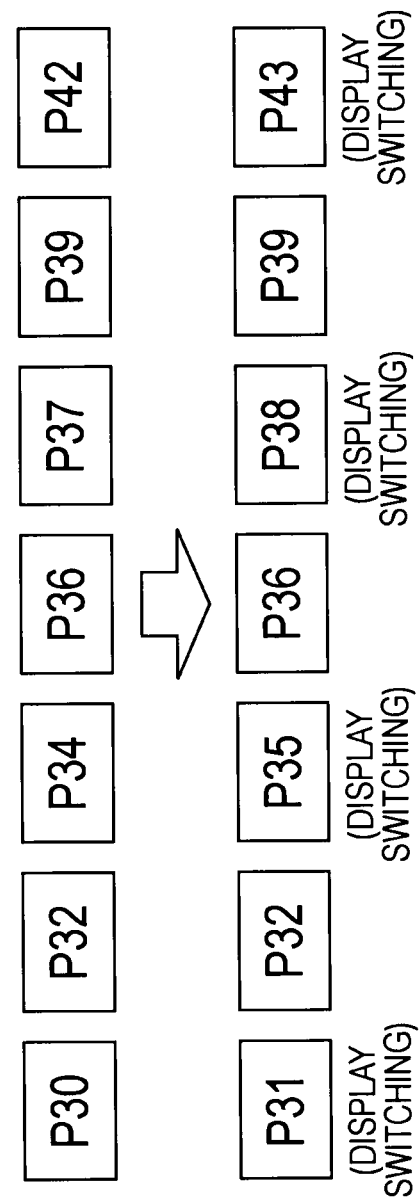
FIG. 11 is a conceptual diagram for describing further switching of images in image frames.

For example, in an example shown in FIG. 11, an example in which images to be displayed are updated (incremented) to the next new images in odd-numbered image frames is illustrated. More particularly, an image in the first image frame from the left is switched from P30 to P31; an image in the third image frame from the left is switched from P34 to P35; an image in the fifth image frame from the left is switched from P37 to P38; an image in the seventh image frame from the left, that is, an image in the rightmost image frame, is switched from P42 to P43. However, as a matter of course, this switching method is only an example, and the manner of switching is not limited thereto.

As has been described above, according to the first embodiment of the present invention, in a display control apparatus, a display control program, a display control method, and a display system for providing a list of thumbnail images, a group of thumbnail images is organized into groups according to a time axis, such as image capturing date/time. Images that cannot be displayed in one line are permuted and displayed one at a time at the same position. When a specific thumbnail image is selected, thumbnails in the same line are appropriately expanded and displayed.

Also, by simply mounting a memory card into a memory card slot, image data recorded in the memory card is automatically read, and thumbnails are displayed in a format in which an overview of all pieces of the image data can be provided. Further, since the thumbnail images are arranged in order of image capturing date/time, as has been described above, an advantage occurs in that a desired image can be easily searched for. Further, the image capturing date/time is a broad concept that includes at least one of image capturing date and image capturing time. Also, the image capturing time may include all pieces of information indicating seconds, minutes, and hours, such as 10:10:10, or may not include part of the information.

Next, a second embodiment of the present invention will be described.

Hereinafter, with reference to the conceptual diagram of FIG. 12 and the flowchart of FIG. 13, a characteristic process performed by the display control apparatus according to the second embodiment of the present invention will be described in detail.

The outline is described. The display control apparatus sorts image data based on at least one of folder name and file name, allocates the image data to image-frame objects of a screen object, allocates remaining images (thumbnail images in this example; the same applies hereinafter) at random to the image-frame objects, and appropriately switches display.

Figure 12:
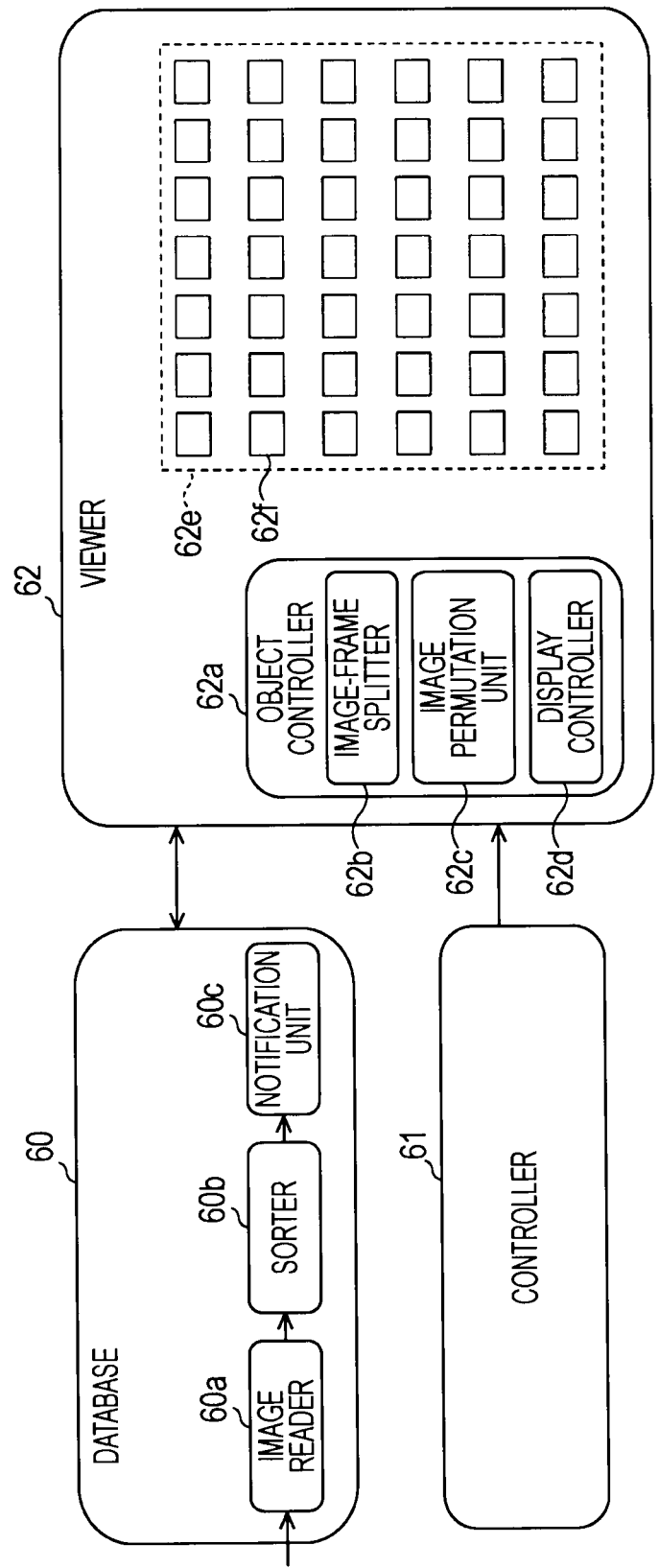
FIG. 12 is a diagram conceptually showing logical functions of the display control apparatus according to the second embodiment of the present invention.

FIG. 12 conceptually shows logical functions of the CPU 1.

The CPU 1 of the display control apparatus reads and executes the program 5*a* stored in the ROM 5, thereby functioning as a database 60, a controller 61, and a viewer 62, such as those shown in FIG. 12. More specifically, the database 60 is equipped with, as functions, at least an image reader 60*a*, a sorter 60*b*, and a notification unit 60*c*. The viewer 62 is equipped with, as a function, at least an object controller 62*a*. More specifically, the viewer 62 is equipped with, as functions, at least an image-frame splitter 62*b*, an image permutation unit 62*c*, and a display controller 62*d*.

Further, in the second embodiment, the example in which 7×6 or forty-two image frame objects 62*f* are provided in total in a screen object 62*e* has been illustrated. However, the second embodiment is not limited to this example. A plurality of thumbnail images can be allocated to each image-frame object 62*f*.

Here, objects are based on the so-called object oriented idea. Objects have a functional hierarchical structure including the screen object 62*e* and the image-frame objects 62*f*. That is, the screen object 62*e* resides in an upper layer, and the image-frame objects 62*f* reside in a lower layer therebelow. Upon receipt of images allocated to each line, the screen object 62*e* further allocates the images to the individual image-frame objects 62*f* and instructs the individual image-frame objects 62*f* to display the images. In fact, the screen object 62*e* supervises allocating images to the image-frame objects 62*f* and instructing the image-frame objects 62*f* to display the images. In contrast, the image-frame objects 62*f* are different from the screen object 62*e* in terms of software. The image-frame objects 62*f* manage the display positions of images and the like on a one-piece-by-one-piece basis. Further, under such management, the image-frame objects 62*f* perform display control of the thumbnail images on the basis of the display instruction from the screen object 62*e*.

Further, the sorter 60*b* realizes, for example, a sorting function. The image-frame splitter 62*b* realizes, for example, an image-frame allocating function. Moreover, the display controller 62*d* realizes, for example, a display control function.

Hereinafter, a display control process will now be described in detail with reference to the flowchart of FIG. 13. Further, all/some of the individual steps constituting the process correspond to a display control method.

When the memory card 103 is mounted into the memory card slot 19 and the card reader/writer 20 detects this mounting, a state signal is sent to the CPU 1 via the USB host controller 4. When the CPU 1 recognizes the mounting on the basis of the state signal, the CPU 1 reads the program 5a stored in the ROM 5 on the basis of an operating system and starts the process.

When the process is started, the image reader 60a of the database 60 determines whether all images have been read (step S51). Here, the determination is made on the basis of, for example, the state of a predetermined flag. At the time the process enters step S51 for the first time, step S51 is branched to No. The image reader 60a reads image data from the memory card 103 inserted in the memory card slot 19 (step S52) and stores the image data in the RAM 6 (step S53). This reading and storing processing is performed on all pieces of image data (steps S51 to S53).

Figure 14:
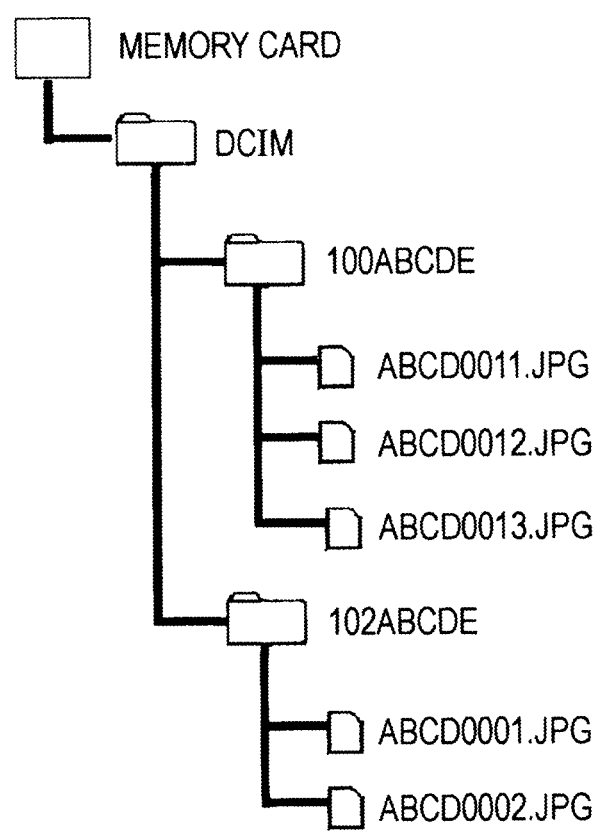
FIG. 14 is a conceptual diagram showing the system of folders and files.

This loop of steps S51 to S53 is repeated, and, when the reading of all the pieces of image data is completed (step S51 is branched to Yes), the sorter 60b of the database 60 sorts the image data stored in the RAM 6 based on at least one of folder name and file name (step S54). When the reading and sorting of all the pieces of image data are completed, the notification unit 60c of the database 60 gives a notification of completion of reading the data to the viewer 62 (step S55). Here, in this embodiment, the image data is sorted based on at least one of folder name and file name. Hereinafter, an example of a system thereof is shown in FIG. 14 and is described.

That is, at the time image data is stored, a folder called "DCIM" is generated in the memory card 100, and further a plurality of folders ("100ABCDE" and "102ABCDE" in this example) are generated. Moreover, predetermined file names are given to image files, respectively, and the image files are stored in the above-described folders. For example, files "ABCD0011.JPG", "ABCD0012.JPG", and "ABCD0013.JPG" are stored in the folder "100ABCDE", and files "ABCD0001.JPG" and "ABCD0002.JPG" are stored in the folder "102ABCDE". Further, such a combination of a folder name and a file name is generally called an "absolute path".

Therefore, with the sorting performed by the above-described sorter 61b, image files are sequentially sorted in the following manner in order of combination of folder name and file name, as described below.
/DCIM/100ABCDE/ABCD0011.JPG
/DCIM/100ABCDE/ABCD0012.JPG
/DCIM/100ABCDE/ABCD0013.JPG
/DCIM/102ABCDE/ABCD0001.JPG
/DCIM/103ABCDE/ABCD0002.JPG Now, upon receipt of the above-described notification, the image-frame splitter 62b of the viewer 62 allocates images to the image-frame objects (step S56). On this occasion, when the number of the images exceeds the number of the image-frame objects 62f, a plurality of images are allocated to the image-frame objects 62f. As a result, when the thumbnail images are displayed in the image-frame objects 62f, the display becomes uniform in the entire screen. In a nutshell, the display result is such that the thumbnail images are decimated in the entire screen. The decimated images may be allocated at random to the image-frame objects 62f. That is, the images may be sequentially allocated to the image-frame objects 62f based on the combination of folder name and file name, and the remaining images may be allocated to image-frame objects 62f specified at random by the object controller 62a.

The image-frame splitter 62b of the object controller 62a of the viewer 62 determines whether the image data has been allocated to all the image-frame objects 62f (step S57). When it is determined that the image data has not been allocated to all the image-frame objects 62f (step S57 is branched to No), the flow returns to step S56 described above, and the above-described allocation processing is repeated. In contrast, when the image-frame splitter 62b determines that the image data has been allocated to all the image-frame objects 62f (step S57 is branched to Yes), the display controller 62d gives a display instruction (step S58).

In terms of hardware, in response to the instruction from the display controller 62d, image data to be displayed is rendered in the video RAM 8, and, using the video controller 9, a component video output signal is output from the component video output terminal 12. Alternatively, after the image data is converted into a composite video signal using the NTSC/PAL encoder 13, the composite video output signal is output from the composite video output terminal 14.

Subsequently, the image permutation unit 62c of the object controller 62a of the viewer 62 determines an image-frame object(s) 62f to which a plurality of images are allocated at random (step S59) and instructs the corresponding image frame object(s) 62f to permute the image data (step S60). Then, it is determined whether a predetermined time has elapsed (step S61). When the predetermined time has elapsed, the flow returns to step S58, and the foregoing processing is performed.

Further, the processing in steps S58 to S61 is executed when there are a remaining number of images as a result of allocation of images to the image-frame objects 62f.

Accordingly, for example, in the case where the memory card 103 is removed from the memory card slot 19 or an operation is entered through the remote control, the controller 61 instructs the object controller 62a of the viewer 62 to perform interruption processing. In this case, the object controller 62a performs display control in accordance with this instruction.

A configuration example of images displayed on the display apparatus 104 using the foregoing process has already been shown in FIG. 8, and a repeated description thereof is omitted. In performing this display, image data is allocated to the image-frame objects 62f in the sorting order based on the above-described "absolute path", and display based thereon is performed.

As has been described, according to the second embodiment of the present invention, a plurality of images are sorted based on at least one of folder name and file name. Then, the images are allocated to a screen object having a plurality of image-frame objects. Accordingly, the images are displayed in a format in which an overview of the entirety can be provided, and the user can easily and quickly find a desired piece from among all the pieces of image data. Furthermore, even when the number of the images exceeds the number of the image-frame objects of the screen object, display permutation is uniformly performed in random display, thus improving the user's convenience in finding a desired image.

Next, a third embodiment of the present invention will be described.

In the display control apparatus according to the third embodiment, when the number of the images exceeds the number of the image-frame objects, optimal overview display is realized by changing the size of the screen object, that is, the number of the image-frame objects included in the screen object. Further, since the hardware configuration of the display control apparatus according to the third embodiment is similar to what has been described above (FIGS. 1 to 3), hereinafter, with reference to FIGS. 1 to 3 as needed, the same reference is given to the same structure, and a repeated description thereof is omitted.

Figure 17:
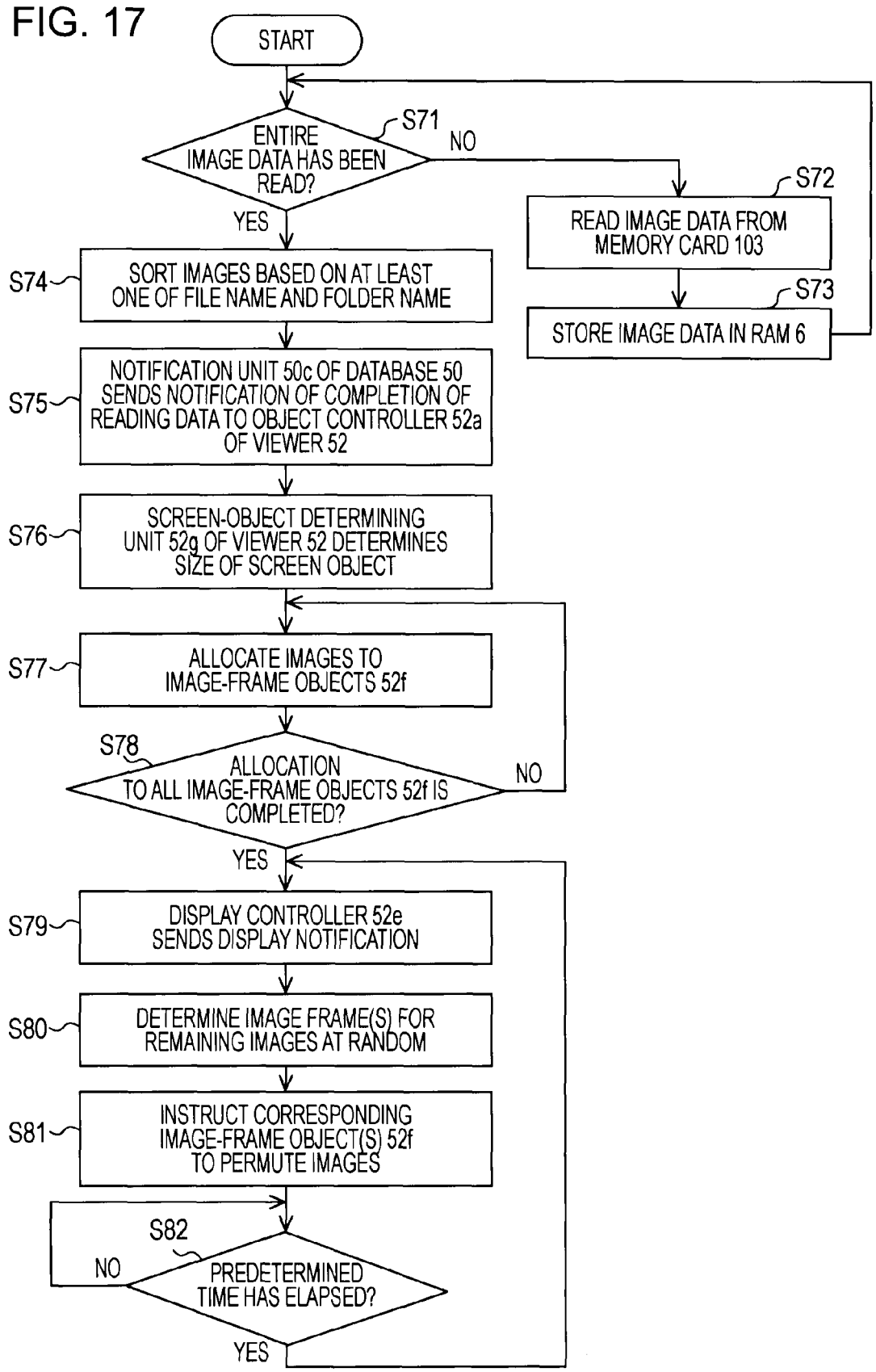
FIG. 17 is a flowchart for describing the flow of a characteristic process performed by the display control apparatus according to the third embodiment of the present invention.

Hereinafter, with reference to FIGS. 15 to 17, a characteristic process performed by the display control apparatus according to the third embodiment of the present invention will be described in detail.

Figure 15:
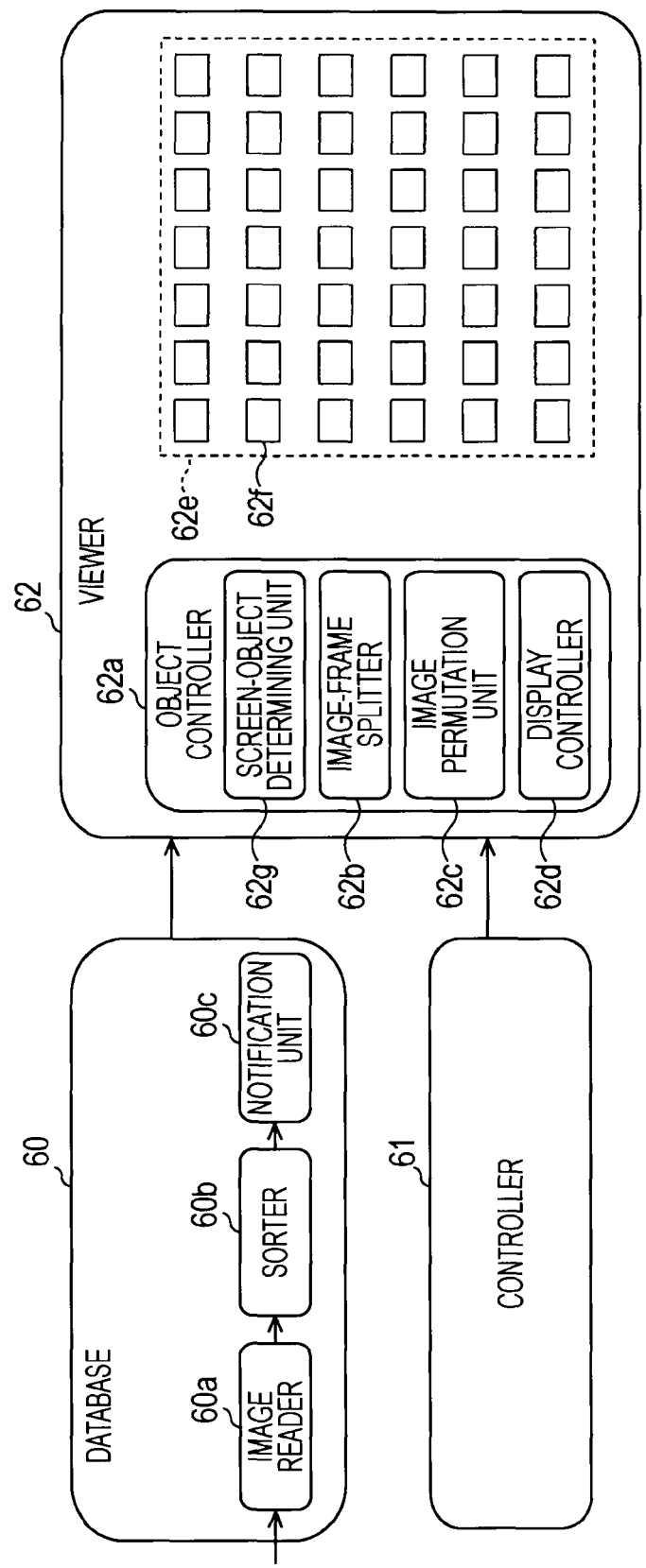
FIG. 15 is a diagram conceptually showing logical functions of the display control apparatus according to the third embodiment of the present invention.

FIG. 15 conceptually shows logical functions of the CPU 1.

A difference from the above-described second embodiment resides in the point that the object controller 62*a* of the viewer 62 is equipped with, as a function, a screen-object determining unit 62*g*. The screen-object determining unit 62*g* determines the optimal image object 62*e* in accordance with the number of images that are sorted based on at least one of folder name and file name.

For example, the relationship between the number of images and the screen object is as follows.

The number of images 1: screen object 62*e*-1 (see FIG. 16(*a*))

The number of images 2 to 4: screen object 62*e*-2 (see FIG. 16(*b*))

The number of images 5 to 12: screen object 62*e*-3 (see FIG. 16(*c*))

The number of images 13 to 20: screen object 62*e*-4 (see FIG. 16(*d*))

The number of images 21 to 30: screen object 62*e*-5 (see FIG. 16(*e*))

The number of images 31 or more: screen object 62*e*-6 (see FIG. 16(*f*))

In the foregoing example, the number of images that can be simultaneously displayed on one screen is limited to 42. When the number exceeds that, images that cannot be simultaneously displayed are permuted at random and displayed.

Therefore, for example, when there are 43 images, the screen object 62*e*-6 is selected. This results in permutation of display of only one image that has not been allocated, and hence, the meaning of switching becomes less important. To this end, for example, as shown in FIG. 16(*g*), a screen object 62*e*-7 that can display more (56 in this example) without permutation is generated. When the number exceeds 56, the screen object is switched one step back to the screen object 62*e*-6 of FIG. 16(*f*), that is, the screen object in which the display size of each image is smaller, thereby increasing the number of pieces of image data that cannot be simultaneously displayed. By displaying these pieces of image data at random, the user can more easily grasp the overview and select a desired image.

The foregoing idea is applicable to the other screen objects 62*e*-1 to 62*e*-6. When the number of images that cannot be allocated to image-frame objects and simultaneously displayed is less than a predetermined fraction of the number of image-frame objects in each screen object, the screen object is switched one step back, that is, the screen object including fewer image-frame objects is determined, and the number of images switched at random is increased.

In this manner, in the third embodiment, the image-frame splitter 62*b* allocates images sorted by the sorter 60*b* to a predetermined number of image-frame objects of the screen object determined by the screen-object determining unit 62*g*. When the number of the images exceeds the number of the image-frame objects, a plurality of images are allocated at least to some of the image-frame objects. Alternatively, when the number of images sorted by the sorter 60*b* exceeds the number of the image-frame objects of the screen object to which the allocation is to be made, if the exceeding number is less than a predetermined number, the image-frame splitter 62*b* determines a screen object including fewer image-frame objects than the screen object corresponding to the number of the images. Alternatively, when the number of images sorted by the sorter 60*b* is less than or equal to a predetermined fraction with respect to the number of the image-frame objects of the determined screen object, the image-frame splitter 62*b* determines a screen object including fewer image-frame objects than the screen object corresponding to the number of the images. The screen-object determining unit 62*g* realizes, for example, a screen-object determining function.

Hereinafter, a display control process will now be described in detail with reference to the flowchart of FIG. 17.

Further, all/some of the individual steps constituting the process correspond to a display control method.

Figure 13:
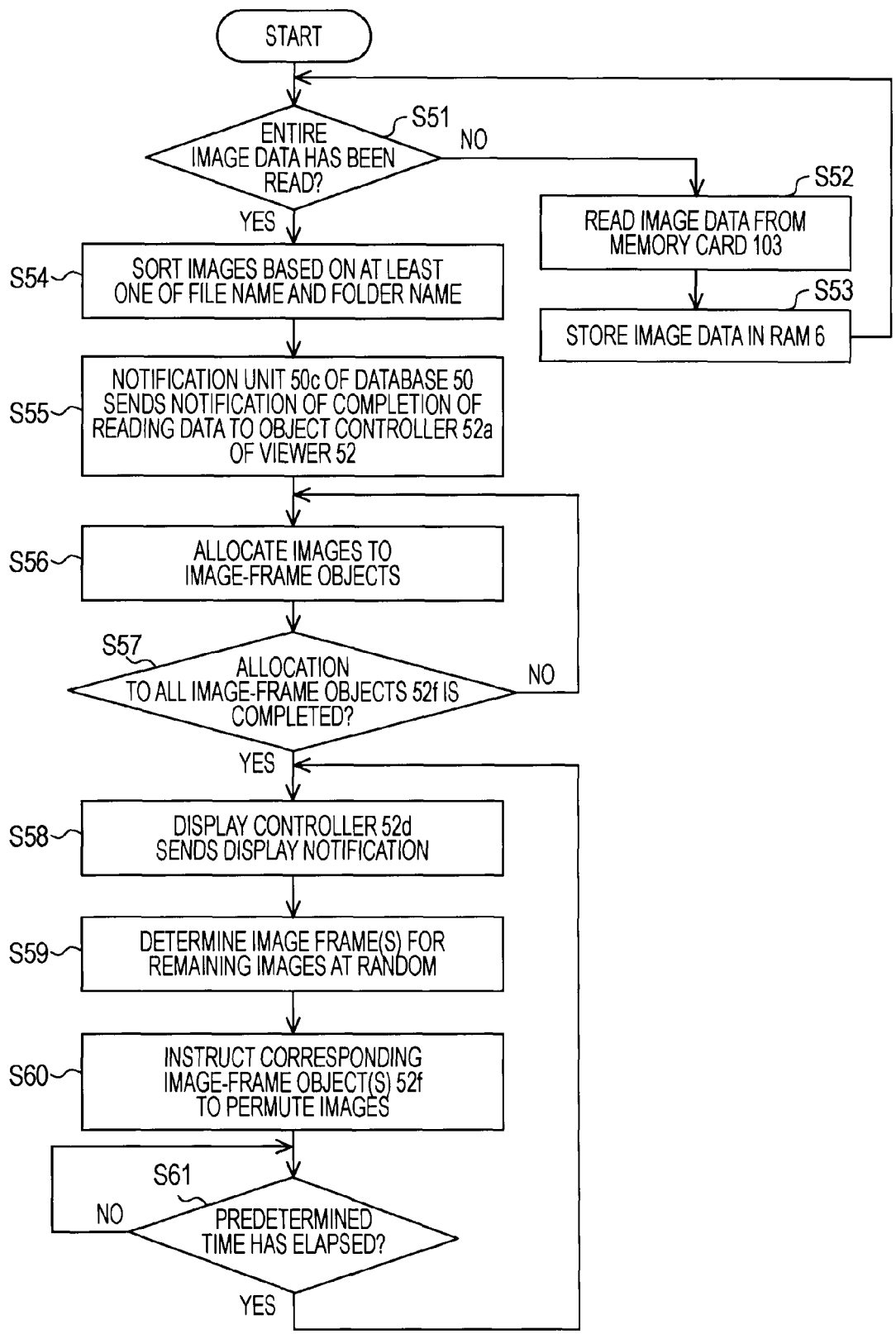
FIG. 13 is a flowchart for describing the flow of a characteristic process performed by the display control apparatus according to the second embodiment of the present invention.

In steps S71 to S75, processing similar to steps S51 to of FIG. 13 is executed. Here, a repeated description thereof is omitted.

In step S76, upon receipt of a notification from the notification unit 60*c*, the screen-object determining unit 62*g* of the viewer 62 determines the size of the screen object in accordance with the number of sorted images. Here, as has been described above, an appropriate one is determined from among the screen objects shown in parts (a) to (g) of FIG. 16 in accordance with the number of images.

Since the processing from this point onward, that is, the processing in steps S77 to S82, is similar to steps S56 to S61 of FIG. 13, a repeated description thereof is omitted here.

Also, for example, in the case where the memory card 103 is removed from the memory card slot 19 or an operation is entered through the remote control, the controller 61 instructs the object controller 62*a* of the viewer 62 to perform interruption processing. In this case, the object controller 62*a* performs display control in accordance with this instruction.

As has been described above, according to the third embodiment of the present invention, images are sorted based on at least one of folder name and file name. On the basis of the number of sorted images, an optimal screen object is determined, and the images are allocated to image-frame objects of the screen object. Then, the remaining images are allocated to randomly selected image-frame objects, and display permutation is performed. Therefore, advantages occur in that an overview of images can be easily gained and desired image data can be easily selected.

Next, a fourth embodiment of the present invention will be described.

In the fourth embodiment, images (thumbnail images in this example; the same applies hereinafter) sorted in order of the combination of folder name and file name, that is, the so-called absolute path, are first split into line objects and then into image-frame objects in each line object.

Further, since the hardware configuration of the display control apparatus according to the fourth embodiment is similar to the above-described first embodiment (FIGS. 1 to 3), hereinafter, with reference to FIGS. 1 to 3 as needed, the same reference is given to the same structure, and a repeated description thereof is omitted.

First, with reference to the conceptual diagram of FIG. 18 and the flowchart of FIG. 19, a characteristic process performed by the display control apparatus according to the fourth embodiment of the present invention will be described in detail.

Figure 18:
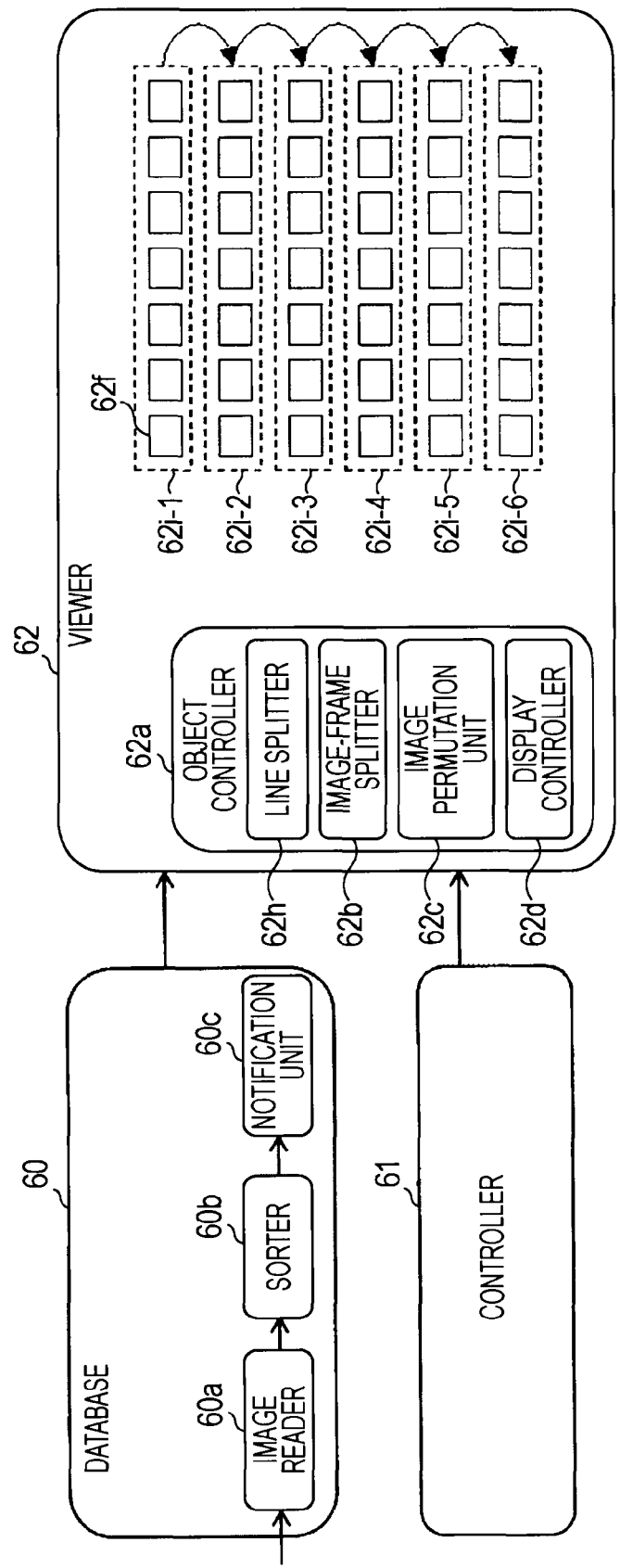
FIG. 18 is a diagram conceptually showing logical functions of the display control apparatus according to the fourth embodiment of the present invention.

FIG. 18 conceptually shows logical functions of the CPU 1.

In comparison with FIGS. 12 and 15 described above, the difference resides in the point that the object controller 62*a* has a line splitter 62*h*. The line splitter 62*h* splits images sorted based on at least one of folder name and file name into the number of line objects 62*i*-1 to 62*i*-6 and allocates the images to the line objects 62*i*-1 to 62*i*-6. Further, in the fourth embodiment, the example in which the six line objects 62*i*-1 to 62*i*-6 are provided as line objects, and each line object has seven image-frame objects 62*f* has been illustrated. However, as a matter of course, the fourth embodiment is not limited to this example. Also, a plurality of images can be allocated to each image-frame object 62*f*. The definitions of the line objects and the image-frame objects are as described in the first embodiment.

Hereinafter, a display control process will now be described in detail with reference to the flowchart of FIG. 19.

Further, all/some of the individual steps constituting the process correspond to a display control method.

Since the processing in steps S91 to S95 of FIG. 19 is similar to the processing in steps S51 to S55 of FIG. 13 described above, a repeated description thereof is omitted.

Upon receipt of a notification from the notification unit 60*c* of the database 60, the line splitter 62*h* of the viewer 62 splits sorted images into six groups (step S96) and allocates the split images to the line objects 62*i*-1 to 62*i*-6 (step S97).

With this, the line splitter 62*h* determines whether allocation to all the line objects 62*i*-1 to 62*i*-6 is completed, and repeats the processing in step S87 until allocation of all the images is completed (step S98). Then, when allocation to all the line objects 62*i*-1 to 62*i*-6 is completed (step S98 is branched to Yes), the image-frame splitter 62*b* of the viewer 62 determines whether there are eight or more images allocated to each of the line objects to 62*i*-6 (step S99).

When the image-frame splitter 62*b* determines in step S99 that there are eight or more images (step S99 is branched to Yes), these images do not fit into one line. Thus, the images are split into the number of images that can be displayed in one line (7 in this example) (step S100), and the images are allocated to the image-frame objects 62*f* (step S101).

Further, if the number of the images is not divisible by 7, in step S101, the image-frame splitter 62*b* randomly allocates the remainder to the individual image-frame objects 62*f* one at a time so as to avoid disproportion. Also, when a plurality of images are allocated to each image-frame object 62*f*, the image-frame splitter 62*b* gives a priority level to each image so that the images are displayed in order of the absolute path described above.

In contrast, when the number of the images allocated to each of the line objects 62*i*-1 to 62*i*-6 is 7 or less, the images can fit into one line. Thus, the images are allocated to the image-frame objects 62*f* so that the images can be displayed nearer to the center (step S101).

With this, the image-frame splitter 62*b* determines whether allocation of the images to all the image-frame objects 62*f* is completed (step S102).

That is, the image-frame splitter 62*b* repeats the processing in step S101 until allocation of all the images to the image-frame objects 62*f* is completed. When it is determined that allocation of all the images is completed (step S102 is branched to Yes), the display controller 62*d* gives a display instruction (step S103).

In terms of hardware, in response to the instruction from the display controller 62*e*, image data to be displayed is rendered in the video RAM 8, and, using the video controller 9, a component video output signal is output from the component video output terminal 12. Alternatively, after the image data is converted into a composite video signal using the NTSC/PAL encoder 13, the composite video output signal is output from the composite video output terminal 14.

Subsequently, the image permutation unit 62*c* of the object controller 62*a* of the viewer 62 specifies an image-frame object(s) 62*f* at random at predetermined time intervals (step S104) and instructs the corresponding image frame object(s) 62*f* to permute the image data (step S105). On this occasion, when switching from one image to another, if there is no more new image in order of image capturing date/time, images with early absolute paths may be displayed again in ascending order of absolute path. Then, it is determined whether a predetermined time has elapsed (step S106). When the predetermined time has elapsed, the flow returns to step S103, and the foregoing processing is performed. Also, for example, in the case where the memory card 103 is removed from the memory card slot 19 or an operation is entered through the remote control, the controller 61 instructs the object controller 62*a* of the viewer 62 to perform interruption processing. In this case, the object controller 62*a* performs display control in accordance with this instruction.

Figure 20:
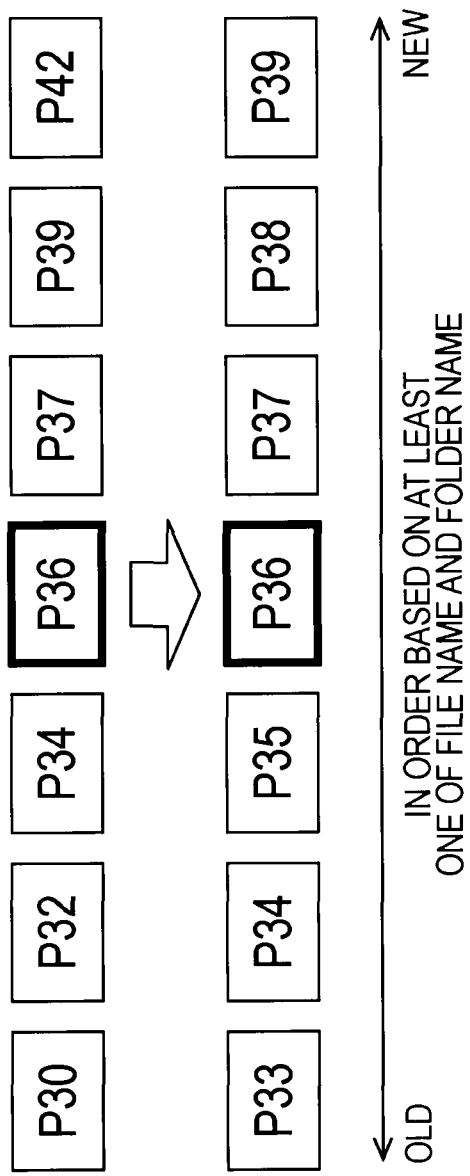
FIG. 20 is a conceptual diagram for describing switching of images in image frames.

For example, as shown in the conceptual diagram of FIG. 20, in image data allocated to an image-frame object in which the cursor is located, the image P36 is displayed in order of absolute path. On the basis of this image frame as a reference point, the images P35, P34, and P33 are sequentially displayed so that old ones in order of absolute path are arranged on the left-hand side, and the images P37, P38, and P39 are sequentially displayed so that new ones are arranged on the right-hand side.

More specifically, an image allocated to an image-frame object positioned at the center is moved to an adjacent image-frame object. Image-frame objects cause image-frame objects other than the image-frame object at the center to move images that are older in order of absolute path than the image displayed in the image-frame object at the center to image-frame objects on the left-hand side. Further, new ones are moved to image-frame objects on the right-hand side. Images allocated to these destinations are further moved to adjacent image-frame objects. In this manner, when images are moved to image-frame objects at both ends, the images are allocated to these image-frame objects.

When the left button 101*c* or the right button 101*d* of the remote control 101 is pressed, all the images are moved to image-frame objects in a direction opposite to this direction. Within the screen, in image-frame objects at both ends, images pile up in the image-frame object positioned at the end on the same side as the moving direction. From the image-frame object positioned at the end in the opposite direction, images are moved one at a time. When there are no more allocated images, control is performed to display an empty space.

Further, this processing is realized by permuting images allocated to the image-frame objects in the line object using the image permutation unit 62*c* of the object controller 62*a* of the viewer 62 upon receipt of an instruction from the controller 61. Moreover, in the case where an image to be displayed has already been allocated to an image-frame object, processing may be performed to increase the priority of this image so that, among allocated images, this image can be displayed.

As has been described above, according to the fourth embodiment of the present invention, images are sorted based on at least one of folder name and file name. The sorted images are split and allocated to line objects. The remaining images are allocated to randomly selected image-frame objects, and display permutation is performed. Therefore, advantages occur in that an overview of images can be easily gained and desired image data can be easily selected.

Next, a processing procedure for splitting image data relating to a plurality of thumbnail images before the plurality of thumbnail images are allocated to image-frame objects will further be described in detail.

In the above-described first embodiment, in allocation of image data relating to a plurality of thumbnail images to image-frame objects, splitting is performed so that the image data can be allocated to predetermined units, such as line objects, in a balanced manner.

Figure 21:
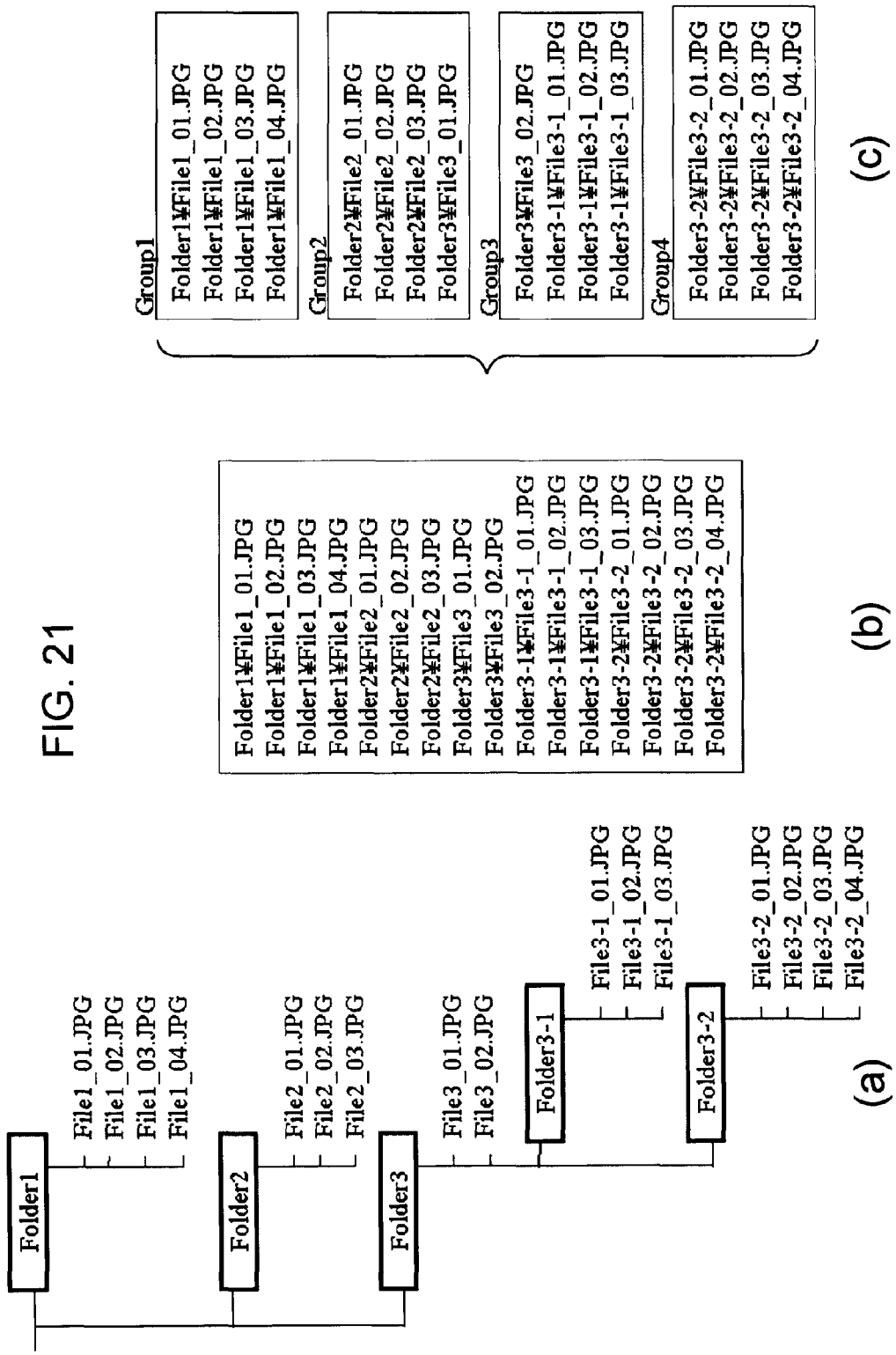
FIG. 21 Parts (a) to (c) of FIG. 21 are conceptual diagrams for describing details of splitting of images using the display control apparatus according to the first to fourth embodiments of the present invention.

As a splitting process, first, one shown in FIG. 21 is applicable.

That is, under a hierarchical structure such as that shown in FIG. 21(a), the case in which files relating to image data (hereinafter simply called files) are stored in folders is assumed. In this case, firstly, as shown in FIG. 21(b), all the files are sorted in order of absolute path. Subsequently, as shown in FIG. 21(c), the files are split into a desired splitting number so that the files are uniformly allocated in order of absolute path. In this example, the case in which the desired splitting number is 4 is assumed.

Figure 22:
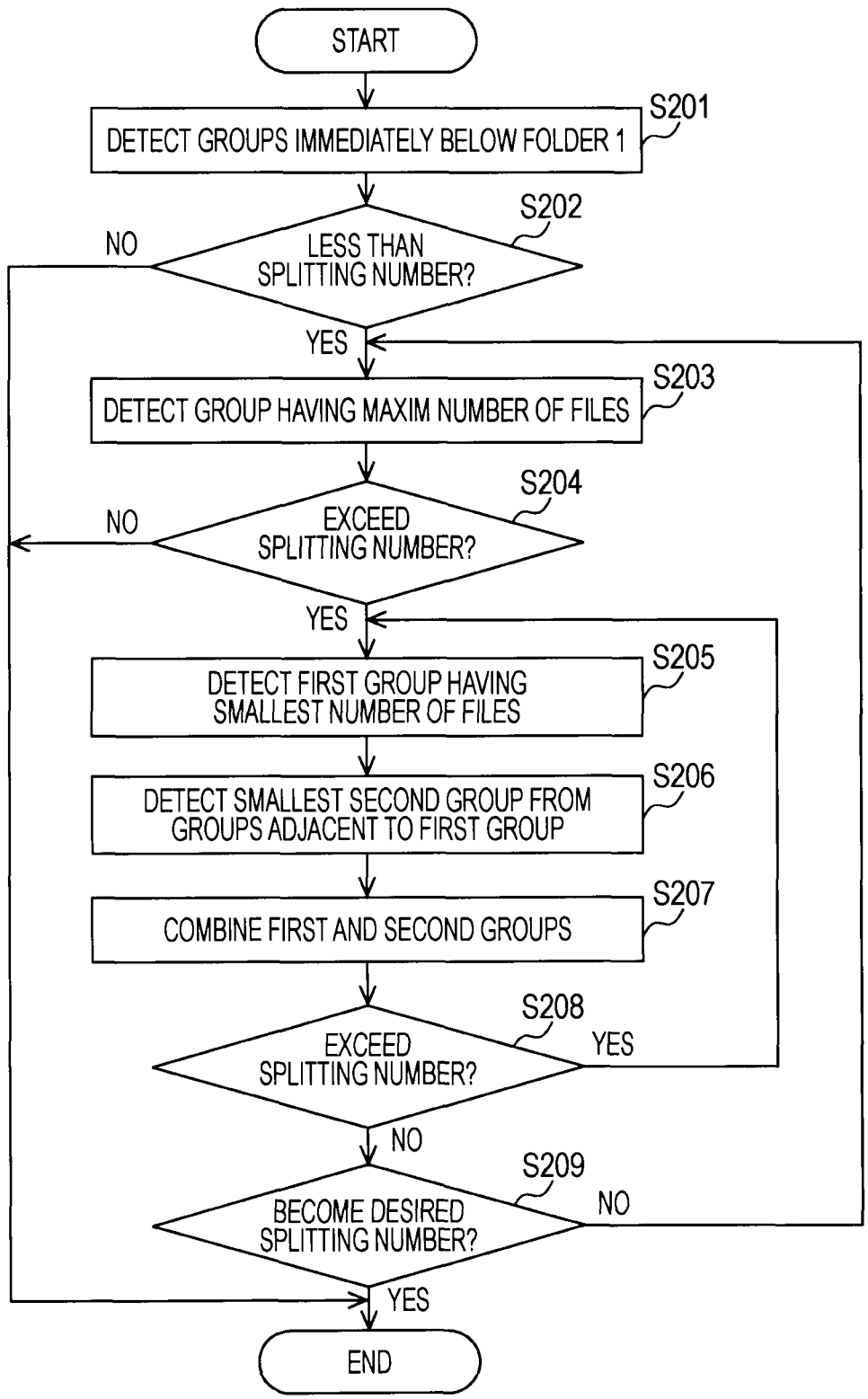
FIG. 22 is a flowchart for describing details of splitting of images using the display control apparatus according to the first to fourth embodiments of the present invention.
Figure 23:
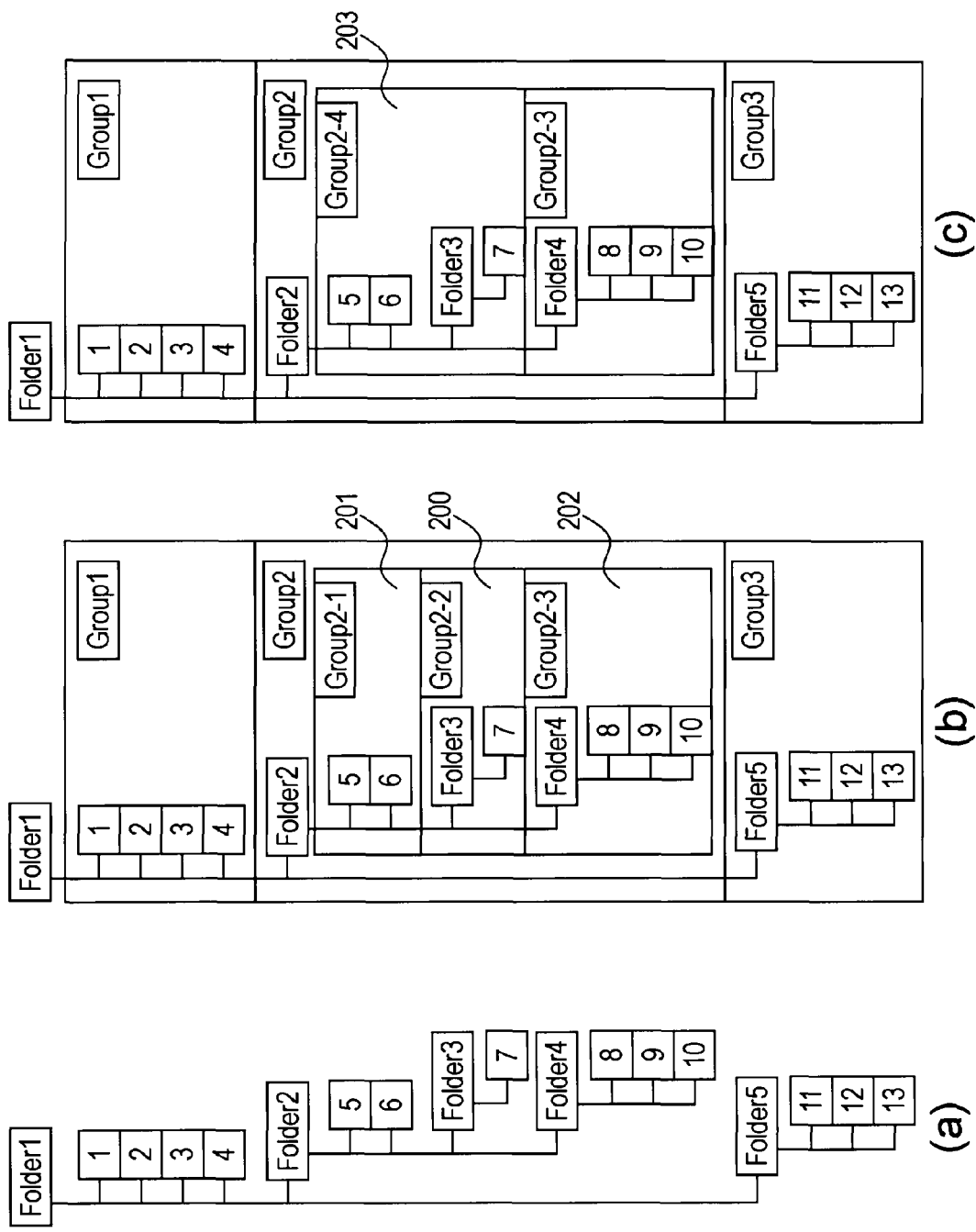
FIG. 23 Parts (a) to (c) of FIG. 23 are conceptual diagrams for further describing details of splitting of images using the display control apparatus according to the first to fourth embodiments of the present invention.

Next, with reference to FIGS. 22 and 23, another splitting process is described.

Here, under a hierarchical structure such as that shown in FIG. 23(a), the case in which files relating to image data are stored in folders is assumed. Further, for example, when this process is applied to the first embodiment, the line splitter 52b executes this process.

First, the number of files and the number of folders immediately below a folder 1 and are detected (step S201).

Here, files located immediately below are defined as one group, and folders located immediately below are each defined as one group. It is then detected whether the number of groups immediately below the folder 1 is less than the splitting number (step S202). When it is detected here that the number of groups of files and folders immediately below the folder 1 is greater than or equal to the splitting number (step S202 is branched to No), splitting is not necessary. Thus, this process is terminated. In contrast, when the number of groups is less than the splitting number, the flow enters a splitting process.

That is, a group having the maximum number of files is detected (step S203), and the number of folders one level lower than that group is detected (step S204). Then, it is determined whether, when the number of folders one level lower is added, the sum exceeds the splitting number (step S204).

Here, when the sum does not exceed the number of split groups, a combining process is not necessary. Thus, the flow proceeds to step S209. In contrast, when the sum exceeds the number of split groups, a combining process is performed.

That is, a first group having the smallest number of files is detected (step S205). In this example, a folder 3 shown in FIG. 23(b) serves as a first group 200. Subsequently, the smallest second group is detected from groups 201 and 202 adjacent to the first group 200 (step S206). In this example, files immediately below a folder 2 serve as a second group 201. Then, the first group 200 and the second group 201 are combined (step S207). As a result, as shown in FIG. 23(c), a new combined group 203 is generated. Then, it is determined whether the number of groups exceeds the splitting number (step S208). When the number of groups exceeds the splitting number, the flow returns to step S205, and a combining process is again performed.

In contrast, when the number of groups does not exceed the splitting number, the flow proceeds to step S209. Then, it is determined whether the number of groups is the splitting number (step S209). When the number of groups is not the splitting number, the flow returns to step S203, and the foregoing process is repeated. In contrast, when the number of groups is the splitting number, this process is terminated. With such a series of processes, images can be split into a desired splitting number.

Besides the foregoing, these two processes can be combined.

That is, with the processing in steps S201 to S203 of FIG. 22, when the number of groups is less than the splitting number, a group having the maximum number of files is detected. Then, with the processing such as that described in parts (a) to (c) of FIG. 21, files in the group having the maximum number of files are arranged in order of absolute path and are split into a desired splitting number.

Next, with reference to FIGS. 24 and 25, structural features common to the display control apparatus according to the first to fourth embodiments of the present invention will be described. That is, as shown in parts (a) and (b) of FIG. 24, a switch member 100a provided on an upper face of this display control apparatus is rotatable about a shaft 100b which serves as the fulcrum. Moreover, as shown in FIG. 24(a), when α side is pressed, the power switch 21 is no longer pressed, and power of the apparatus main body enters an off state. In contrast, as shown in FIG. 24(b), when β side is pressed, a tip portion of the switch member 100a presses the power switch 21. Accordingly, power of the apparatus main body enters an on state.

The above-described memory card slot 19 is disposed in the switch member 100a. As shown in FIG. 25(a), in a state where the power switch is not pressed, that is, in a power-off state, the memory card slot 19 is at a position where the memory card slot 19 is not visible to the outside. Thus, the memory card 103 cannot be mounted. In contrast, in a state where the power switch is pressed, that is, in a power-on state, the memory card slot 19 is at a position where the memory card slot 19 is visible to the outside. Thus, the memory card 103 can be mounted. Further, more specifically, as shown in parts (a) and (b) of FIG. 25, the memory card slot 19 is constituted of a plurality of slots into which a plurality of types of memory cards can be mounted.

As has been described above, according to the first to fourth embodiments of the present invention, in a display control apparatus, a display control program, a display control method, and an image reproducing system for displaying a list of thumbnail images, a group of thumbnail images is sorted based on the combination of folder name and file name, that is, the absolute path. Also, for image data that cannot be displayed on one screen, displaying of images is permuted in, for example, randomly selected image frames.

Also, by simply mounting a memory card into a memory card slot, image data recorded in the memory card is automatically read, and thumbnails are displayed in a format in which an overview of the entire image data can be provided. Also, since the group of thumbnail images is arranged in order of image capturing date/time, as has been described above, an advantage occurs in that a desired image can be easily searched for.

Although the embodiments of the present invention have been described above, as a matter of course, the present invention is not limited thereto, and various modifications and alterations can be made without departing from the scope thereof.

For example, although the application examples as a display control apparatus, a display control method, a display control program, and a display system have been illustrated in the above-described embodiments, a digital camera or a digital video camera with a display function may itself be implemented with a display control apparatus so as to be capable of displaying thumbnail images so that the above-described overview can be provided.

Alternatively, a display control program may be installed in a personal computer or a PDA (Personal Digital Assistants) so as to be capable of displaying thumbnail images so that the above-described overview can be provided. Furthermore, as a matter of course, a TV (television) apparatus may be provided with the function of a display control apparatus.

Furthermore, although the examples in which images are displayed in order of image capturing date/time have been illustrated in the foregoing embodiments, the present invention is not limited thereto, and images can be arranged in various orders. Also, the above-described image capturing date/time is a broad concept that includes at least one of image capturing date and image capturing time.

Furthermore, although the examples in which images are displayed in order of absolute path have been illustrated in the foregoing embodiments, the present invention is not limited thereto, and images can be arranged in various orders.

According to the present invention, when displaying a plurality of thumbnail images, a display control apparatus, a display control method, a display control program, and a display system for realizing display capable of providing an overview of the entirety of a group of these thumbnail images can be provided.

Furthermore, a display control apparatus, a display control method, a display control program, and a display system that can realize display suitable for finding a desired image by being capable of providing an overview can be provided.

The invention claimed is:

1. A display control apparatus comprising:
    circuitry configured to act as:
        a sorting unit that sorts images to be displayed on a display on the basis of an image capturing date or an image capturing time;
        a line splitting unit that splits the images sorted by the sorting unit into a predetermined number of line objects, each line object corresponding to a separate row of displayed images on the display and having a predetermined number of image-frame objects that each correspond to a displayed image location on the row, the images being split into the line objects based on sizes of gaps between the image capturing dates or image capturing times detected over all of the images, such that when there are a plurality of gaps between the image capturing dates or image capturing times detected over all of the images, the size of each of the gaps is determined, and the largest gaps among the plurality of gaps are used to group the images into each of the line objects;
        an image-frame allocating unit that allocates, when allocating the images to be displayed to the predetermined number of image-frame objects for each line object, a plurality of images to at least one of the image-frame objects when the number of the images to be allocated to the line object exceeds the predetermined number of image-frame objects for the line object; and
        a display controller that controls display of the images allocated to the individual image-frame objects,
    wherein the display controller controls, when the plurality of images are allocated to the at least one of the image-frame objects, display of the images so that all the images to be displayed are displayed within a certain time by switching the images to be displayed at predetermined time intervals, and
    wherein, when one of the image-frame objects is selected and when the number of the images to be allocated to the line object of the selected image-frame object exceeds the predetermined number of image-frame objects for the line object, the display controller controls the display of the images so that an image selected at the selected image frame object is maintained at a same position in the line object and the remaining images allocated to the line object are sequentially displayed in ascending order on the basis of the selected image-frame object as a reference point, and the line object of the selected image frame object does not change from its displayed position on the display.

2. The display control apparatus according to claim 1,
    wherein the display controller controls, when an image allocated to one of the image-frame objects is selected, display so that the image data is displayed within a full screen.

3. A display control apparatus comprising:
    circuitry configured to act as:
        an image-frame allocating unit that allocates, when allocating images to be displayed to a predetermined number of image-frame objects, a plurality of images to at least one of the image-frame objects when the number of the images to be allocated to the individual image-frame objects exceeds the number of the image-frame objects; and
        a display controller that controls display of the images allocated to the individual image-frame objects, wherein the display controller controls, when the plurality of images are allocated to the at least one of the image-frame objects, display of the images so that all the images to be displayed are displayed within a certain time by randomly switching a number of the images to be displayed at predetermined time intervals;
        a sorting unit that sorts the images on the basis of a predetermined reference; and
        a screen-object determining unit that initially determines, on the basis of the number of the images sorted by the sorting unit, a screen object corresponding to the number of the pieces of image data from among a plurality of screen objects having different numbers of image-frame objects, each screen object corresponding to a separate maximum number of displayed images over the entire display,
    wherein, when the number of the images sorted by the sorting unit exceeds the number of the image-frame objects of the initially determined screen object to which the allocation is to be made, in a case where the exceeding number is less than a predetermined number, the screen-object determining unit determines a screen object having fewer image-frame objects than the initially determined screen object to be used instead of the initially determined screen object and the number of images to be randomly switched to be displayed at predetermined time intervals increases from the initially determined screen object to the screen object having fewer image-frame objects.

4. A display control apparatus comprising:
    circuitry configured to act as:
        an image-frame allocating unit that allocates, when allocating images to be displayed to a predetermined number of image-frame objects, a plurality of images to at least one of the image-frame objects when the number of the images to be allocated to the individual image-frame objects exceeds the number of the image-frame objects; and a display controller that controls display of the images allocated to the individual image-frame objects, wherein the display controller controls, when the plurality of images are allocated to the at least one of the image-frame objects, display of the images so that all the images to be displayed are displayed within a certain time by randomly switching a number of the images to be displayed at predetermined time intervals;

a sorting unit that sorts the images on the basis of a predetermined reference; and a screen-object determining unit that initially determines, on the basis of the number of the images sorted by the sorting unit, a screen object corresponding to the number of the pieces of image data from among a plurality of screen objects having different numbers of image-frame objects, each screen object corresponding to a separate maximum number of displayed images over the entire display, wherein, when the number of the images sorted by the sorting unit is less than or equal to a predetermined fraction with respect to the number of the image-frame objects of the initially determined screen object, the screen-object determining unit determines a screen object having fewer image-frame objects than the initially determined screen object to be used instead of the initially determined screen object and the number of images to be randomly switched to be displayed at predetermined time intervals increases from the initially determined screen object to the screen object having fewer image-frame objects.

5. The display control apparatus according to claim 3, wherein the predetermined reference is at least one of a folder name and a file name.

6. The display control apparatus according to claim 4, wherein the predetermined reference is at least one of a folder name and a file name.

7. A display control method implemented on a display control apparatus comprising:

sorting, by a sorting unit, images to be displayed on a display on the basis of an image capturing date or an image capturing time;

splitting, by a line splitting unit, the images sorted by the sorting unit into a predetermined number of line objects, each line object corresponding to a separate row of displayed images on the display and having a predetermined number of image-frame objects that each correspond to a displayed image location on the row, the images being split into the line objects based on sizes of gaps between the image capturing dates or image capturing times detected over all of the images, such that when there are a plurality of gaps between the image capturing dates or image capturing times detected over all of the images, the size of each of the gaps is determined, and the largest gaps among the plurality of gaps are used to group the images into each of the line objects;

allocating, by an image-frame allocating unit, when allocating the images to be displayed to the predetermined number of image-frame objects for each line object, a plurality of images to at least one of the image-frame objects when the number of the images to be allocated to line object exceeds the predetermined number of image-frame objects for the line object; and controlling, by a display controller, display of the images allocated to the individual image-frame objects, wherein, in the controlling, when the plurality of images are allocated to the at least one of the image-frame objects, display of the images is controlled so that all the images to be displayed are displayed within a certain time by switching the images to be displayed at predetermined time intervals, wherein, when one of the image-frame objects is selected and when the number of the images to be allocated to the line object of the selected image-frame object exceeds the predetermined number of image-frame objects for the line object, the controlling includes controlling the display of the images so that an image selected at the selected image frame object is maintained at a same position in the line object and the remaining images allocated to the line object are sequentially displayed in ascending order on the basis of the selected image-frame object as a reference point, and the line object of the selected image frame object does not change from its displayed position on the display.

8. A non-transitory computer readable storage medium storing a display control program for causing a computer to execute a display control method, the display control method comprising the steps of:

sorting images to be displayed on a display on the basis of an image capturing date or an image capturing time;

splitting the images sorted into a predetermined number of line objects, each line object corresponding to a separate row of displayed images on the display and having a predetermined number of image-frame objects that each correspond to a displayed image location on the row, the images being split into the line objects based on sizes of gaps between the image capturing dates or image capturing times detected over all of the images, such that when there are a plurality of gaps between the image capturing dates or image capturing times detected over all of the images, the size of each of the gaps is determined, and the largest gaps among the plurality of gaps are used to group the images into each of the line objects;

allocating, when allocating the images to be displayed to the predetermined number of image-frame objects for each line object, a plurality of images to at least one of the image-frame objects when the number of the images to be allocated to line object exceeds the predetermined number of image-frame objects for the line object; and controlling display of the images allocated to the individual image-frame objects, wherein, in the controlling, when the plurality of images are allocated to the at least one of the image-frame objects, display of the images is controlled so that all the images to be displayed are displayed within a certain time by switching the images to be displayed at predetermined time intervals, wherein, when one of the image-frame objects is selected and when the number of the images to be allocated to the line object of the selected image-frame object exceeds the predetermined number of image-frame objects for the line object, the controlling includes controlling the display of the images so that an image selected at the selected image frame object is maintained at a same position in the line object and the remaining images allocated to the line object are sequentially displayed in ascending order on the basis of the selected image-frame object as a reference point, and the line object of the selected image frame object does not change from its displayed position on the display.

9. A display system comprising:

circuitry configured to act as:

a sorting unit that images to be displayed on a display on the basis of an image capturing date or an image capturing time, a line splitting unit that splits the images sorted by the sorting unit into a predetermined number of line objects, each line object corresponding to a separate row of displayed images on the display and having a predetermined number of image-frame objects that each correspond to a displayed image location on the row, the images being split into the line objects based on sizes of gaps between the image capturing dates or image capturing times detected over all of the images, such that when there are a plurality of gaps between the image capturing dates or image capturing times detected over all of the images, the size of each of the gaps is determined, and the largest gaps among the plurality of gaps are used to group the images into each of the line objects, an image-frame allocating unit that allocates, when allocating the images to be displayed to the predetermined number of image-frame objects for each line object, a plurality of images to at least one of the image-frame objects when the number of the images to be allocated to the line object exceeds the predetermined number of image-frame objects for the line object, and a display controller that controls display of the images allocated to the individual image-frame objects; and a display that displays the images on the basis of control performed by the display controller, wherein the display controller controls, when the plurality of images are allocated to the image-frame objects, display of all the images to be displayed within a certain time by switching the images to be displayed at predetermined time intervals, and wherein, when one of the image-frame objects is selected and when the number of the images to be allocated to the line object of the selected image-frame object exceeds the predetermined number of image-frame objects for the line object, the display controller controls the display of the images so that an image selected at the selected image frame object is maintained at a same position in the line object and the remaining images allocated to the line object are sequentially displayed in ascending order on the basis of the selected image-frame object as a reference point, and the line object of the selected image frame object does not change from its displayed position on the display.

* * * * *